(12) United States Patent
Sulaiman et al.

(10) Patent No.: US 11,117,912 B1
(45) Date of Patent: Sep. 14, 2021

(54) PLATINUM(II) COMPLEXES CONTAINING DICYCLOPENTADIENE AND DITHIOCARBAMATE AS ANTICANCER AGENTS

(71) Applicant: King Fahd University of Petroleum and Minerals, Dhahran (SA)

(72) Inventors: Adam Ahmed Abdullah Sulaiman, Dhahran (SA); Ali Alhoshani, Riyadh (SA); Anvarhusein A. Isab, Dhahran (SA)

(73) Assignees: King Fahd University of Petroleum and Minerals, Dhahran (SA); King Saud University, Riyadh (SA)

( * ) Notice: Subject to any disclaimer, the term of this patent is extended or adjusted under 35 U.S.C. 154(b) by 18 days.

(21) Appl. No.: 16/814,358

(22) Filed: Mar. 10, 2020

(51) Int. Cl.
*C07F 15/00* (2006.01)

(52) U.S. Cl.
CPC .................. *C07F 15/0086* (2013.01)

(58) Field of Classification Search
None
See application file for complete search history.

(56) References Cited

FOREIGN PATENT DOCUMENTS

| | | |
|---|---|---|
| JP | 2013/114166 A | 6/2013 |
| WO | 2018/069525 A1 | 4/2018 |

OTHER PUBLICATIONS

Manzer "Isocyanide, carbene, diethyldithiocarbamate, and cyclo-octa-1,5-diene complexes of platinum(II)" Journal of the Chemical Society, Dalton Transactions, 1974, pp. 1535-1540.*

Oliver, et al. ; Multimetallic complexes of group 10 and 11 metals based on polydentate dithiocarbamate ligands, Issue 22 ; 2011 ; Abstract Only ; 6 Pages.
Mirabelli, et al. ; Antitumor activity of bis(diphenylphosphino)alkanes, their gold(I) coordination complexes, and related compounds ; Journal of Medicinal Chemistry, 30, 12 ; Dec. 1, 1987 ; 18 Pages.
Kubicki, et al. ; Biscyclopentadienides with transition metalmercury bonds. II: Dithiocarbamato derivatives of molybdenum and tungsten, and X-ray structure of (η5-C5H5)2Mo[HgS2CN(C2H5)2]2 ; Journal of Crystal and Molecular Structure, 11 ; pp. 43-54 ; 1981 ; Abstract Only ; 7 Pages.
Lin, et al. ; Sulfur chelates. 32. Studies of the solid-state molecular structure and solution structures and dynamics of bis (phosphine) adducts of platinum(II) 1,1-dithiolates. Molecular structures of Pt[S2CN(i-Bu)2]2(PMe2Ph)2, Pt (S2CO)(PPh3)2, and Pt(S2CO)(diphos).14CHCl3 ; Inorganic Chemistry, 17, 2 ; Feb. 1, 1978 ; 10 Pages.
Schmidbaur, et al. ; Product Class 6: Organometallic Complexes of Gold ; Science of Synthesis, 3 ; 2 Pages.
Hong, et al. ; Study on Platinum Hydrides ; Acta Chimica Sinica, 47; pp. 191-193 ; 1989 ; 3 Pages ; English Abstract.
Mirabelli, et al. ; Antitumor activity of bis(diphenylphosphino)alkanes, their gold(I) coordination complexes, and related compounds ; Journal of Medicinal Chemistry, 30, 12 ; pp. 2181-2190 ; Feb. 1, 1987 ; Abstract Only ; 18 Pages.
Cornock, et al. ; Metal complexes of Sulphur ligands. Part 13. Reaction of dichloro-(n-cyclo-octa-1,5-diene)-palladium and -platinum complexes with some Sulphur containing nucleophiles ; Journal of the Chemical Society, Dlaton Transactions, Issue 7 ; 1977 ; Abstract Only ; 5 Pages.

* cited by examiner

*Primary Examiner* — Joseph R Kosack
(74) *Attorney, Agent, or Firm* — Oblon, McClelland, Maier & Neustadt, L.L.P.

(57) ABSTRACT

A family of platinum(II) complex with mixed ligands as anticancer agents. The platinum(II) ion is coordinated to dicyclopentadiene and dithiocarbamate ligands. Also described are a pharmaceutical composition incorporating the platinum(II) complex, a methods of synthesizing the platinum(II) complex, and a method of treating cancer. The platinum(II) complexes exhibit potent cytotoxicity against lung and cervical cancer cell lines as well as low nephrotoxicity.

20 Claims, 11 Drawing Sheets

PLATINUM(II) COMPLEXES CONTAINING DICYCLOPENTADIENE AND DITHIOCARBAMATE AS ANTICANCER AGENTS

STATEMENT OF ACKNOWLEDGEMENT

This research was supported by King Fand University of Petroleum and Minerals under the project number IN171005.

BACKGROUND OF THE INVENTION

Technical Field

The present disclosure relates to therapeutic platinum(II) complexes, pharmaceutical compositions thereof, and a method of treating cancer.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Platinum-based compounds such as cisplatin, carboplatin, and oxaliplatin have been used frequently for the treatment of ovarian, testicular, lung, head, neck, colon, and bladder tumors [S. Dilruba, G. V Kalayda, Platinum-based drugs: past, present and future, Cancer Chemother. Pharmacol. 77 (2016) 1103-1124; D. A. Fennell, Y. Summers, J. Cadranel, T. Benepal, D. C. Christoph, R. Lal, M. Das, F. Maxwell, C. Visseren-Grul, D. Ferry, Cisplatin in the modern era: The backbone of first-line chemotherapy for non-small cell lung cancer, Cancer Treatment Rev. 44 (2016) 42-50; G. Y. Ho, N. Woodward, J. I. G. Coward, Cisplatin versus carboplatin: comparative review of therapeutic management in solid malignancies, Crit. Rev. Oncol. Hematal. 102 (2016) 37-46; N. J. Wheate, S. Walker, G. E. Craig, R. Oun, The status of platinum anticancer drugs in the clinic and in clinical trials, Dalton Trans. 39 (2010) 8113-8127; T. C. Johnstone, K. Suntharalingam, S. J. Lippard, The Next Generation of Platinum Drugs: Targeted Pt(II) Agents, Nanoparticle Delivery, and Pt(IV) Prodrugs, Chem. Rev. 116 (2016) 3436-3486; J. J. Wilson, S. J. Lippard, Synthetic Methods for the Preparation of Platinum Anticancer Complexes, Chem. Rev. 114 (2014) 4470-4495; K. S. Lovejoy, S. J. Lippard, Non-traditional platinum compounds for improved accumulation, oral bioavailability, and tumor targeting, Dalton Trans. (2009) 10651-10659; L. Kelland, The resurgence of platinum-based cancer chemotherapy, Nat. Rev. Cancer. 7 (2007) 573; S. Dasari, P. Bernard Tchounwou, Cisplatin in cancer therapy: Molecular mechanisms of action, Eur. J. Pharmacol. 740 (2014) 364-378; and Y. Jung, S. J. Lippard, Chem. Rev. 107 (2007) 1387-1407, each incorporated herein by reference in their entirety]. These compounds bind to nucleic acids within tumor cells and form stable Pt-DNA adducts, which significantly distort the double helical structure of DNA. Such structural distortions induce apoptosis in tumor cells by triggering an array of cellular responses, including inhibition of DNA replication and transcription [L. Kelland, The resurgence of platinum-based cancer chemotherapy, Nat. Rev. Cancer. 7 (2007) 573; S. Dasari, P. Bernard Tchounwou, Cisplatin in cancer therapy: Molecular mechanisms of action, Eur. J. Pharmacol. 740 (2014) 364-378; Y. Jung, S. J. Lippard, Chem. Rev. 107 (2007) 1387-1407; E. R. Jamieson, S. J. Lippard, Structure, Recognition, and Processing of Cisplatin-DNA Adducts, Chem. Rev. 99 (1999) 2467-2498; V. Brabec, O. Hrabina, J. Kasparkova, Cytotoxic platinum coordination compounds. DNA binding agents, Coord. Chem. Rev. 351 (2017) 2-31; S. Ahmad, Kinetic aspects of platinum anticancer agents, Polyhedron 138 (2017) 109-124; S. Ahmad, A. A. Isab, S. Ali, Structural and mechanistic aspects of platinum anticancer agents, Transition Met. Chem. 31 (2006) 1003-1016; S. Ahmad, Platinum-DNA interactions and subsequent cellular processes controlling sensitivity to anticancer platinum complexes, Chem. Biodiver. 7 (2010) 543-566; S. G. Chaney, S. L. Campbell, E. Bassett, Y. Wu, Recognition and processing of cisplatin- and oxaliplatin-DNA adducts, Crit. Rev. Oncol. Hematol. 53 (2005) 3-11; S. Komeda, Unique platinum-DNA interactions may lead to more effective platinum-based antitumor drugs, Metallomics 3 (2011) 650-655; and S. van Zutphen, J. Reedijk, Targeting platinum anti-tumour drugs: Overview of strategies employed to reduce systemic toxicity, Coord. Chem. Rev. 249 (2005) 2845-2853, each incorporated herein by reference in their entirety].

Despite the pervasiveness of platinum-based compounds used as anticancer therapies, serious side effects such as nephrotoxicity, neurotoxicity, and ototoxicity are substantial risks associated with these cancer treatments [J. T Hartmann, H. P. Lipp. Toxicity of platinum compounds, Expert Opin. Pharmacother. 4 (2003) 889-901; V. M. Piccolini, M. G. Bottone, G. Bottiroli, S. A. De Pascali, F. P. Fanizzi, G. Bernocchi, Platinum drugs and neurotoxicity: effects on intracellular calcium homeostasis, Cell Biol. Toxicol. 29 (2013) 339-353; and A. A. Argyriou, P. Polychronopoulos, G. Iconomou, E. Chroni, H. P. Kalofonos. A review on oxaliplatin-induced peripheral nerve damage. Cancer Treat. Rev. 34 (2008) 368-377, each incorporated herein by reference in their entirety]. Moreover, resistance of various cancers to platinum-based compounds, either acquired or inherent, often limits their therapeutic efficacy [L. Galluzzi, L. Senovilla, I. Vitale, J. Michels, I. Martins, O. Kepp, M. Castedo, G. Kroemer, Molecular mechanisms of cisplatin resistance, Oncogene 31 (2012) 1869-1883; D. J. Stewart, Mechanisms of resistance to cisplatin and carboplatin, Crit. Rev. Oncol. Hematol. 63 (2007) 12-31; J. Zisowsky, S. Koegel, S. Leyers, K. Devarakonda, M. U. Kassack, M. Osmak, U. Jaehde, Relevance of drug uptake and efflux for cisplatin sensitivity of tumor cells, Biochem. Pharmacol. 73 (2007) 298; and D.-W. Shen, L. M. Pouliot, M. D. Hall, M. M. Gottesman, Pharmacol. Rev. 64 (2012) 706-721, each incorporated herein by reference in their entirety]. In order to address the clinical disadvantages associated with platinum-based compounds, other metallodrugs with different coordination structures and mechanisms of action have been studied. For example, several cisplatin derivatives having different leaving groups and/or carrier ligands have been developed and undergone clinical trials [N. J. Wheate, S. Walker, G. E. Craig, R. Oun, The status of platinum anticancer drugs in the clinic and in clinical trials, Dalton Trans. 39 (2010) 8113-8127; T. C. Johnstone, K. Suntharalingam, S. J. Lippard, The Next Generation of Platinum Drugs: Targeted Pt(II) Agents, Nanoparticle Delivery, and Pt(IV) Prodrugs, Chem. Rev. 116 (2016) 3436-3486; J. J. Wilson, S. J. Lippard, Synthetic Methods for the Preparation of Platinum Anticancer Complexes, Chem. Rev. 114 (2014) 4470-4495; K. S. Lovejoy, S. J. Lippard, Non-traditional platinum compounds for improved accumulation, oral bioavailability, and tumor targeting, Dalton Trans. (2009)

10651-10659; L. Kelland, The resurgence of platinum-based cancer chemotherapy, Nat. Rev. Cancer. 7 (2007) 573; M. Galanski, M. A. Jakupec, B. K. Keppler, Update of the Preclinical Situation of Anticancer Platinum Complexes: Novel Design Strategies and Innovative Analytical Approaches, Curr. Med. Chem. 12 (2005) 2075-2094; I. Kostova, Platinum Complexes as Anticancer Agents, Recent Pat. Anti-cancer Drug Discov. 1 (2006) 1-22; M. Fanelli, M. Formica, V. Fusi, L. Giorgi, M. Micheloni, P. Paoli, Coord. Chem. Rev. 310 (2016) 41-79; R. Yin, S. Gou, X. Liu, L. Lou, Antitumor activities and interaction with DNA of oxaliplatin-type platinum complexes with linear or branched alkoxyacetates as leaving groups, J. Inorg. Biochem. 105 (2011) 1095-1101; E. Escribano, M. Font-Bardia, T. Calvet, J. Lorenzo, P. Gamez, V. Moreno, DNA binding studies of a series of cis-[Pt(Am)$_2$X$_2$] complexes (Am=inert amine, X=labile carboxylato ligand), Inorg. Chim. Acta 394 (2013) 65-76; M. Proetto, W. Liu, A. Hagenbach, U. Albram, R. Gust, Synthesis, characterization and in vitro antitumor activity of a series of novel platinum(II) complexes bearing Schiff base ligands, Eur. J. Med. Chem. 53 (2012) 168-175; D. Lebwohl, R. Canetta, Clinical development of platinum complexes in cancer therapy: an historical perspective and an update, Eur. J. Cancer 34 (1998) 1522-1534; C. Gao, S. Gou, G. Xu, Synthesis, Characterization and Biological Evaluation of Platinum(II) Complexes with a Chiral N-Monosubstituted 1,2-Cyclohexyldiamine Derivative, Chem. Pharm. Bull. 59 (2011) 851-854; B. A. Miles, A. E. Patterson, C. M. Vogels, A. Decken, J. C. Waller, P. J. Morin, S. A. Westcott, Synthesis, characterization, and anticancer activities of lipophilic pyridinecarboxaldimine platinum(II) complexes, Polyhedron 108 (2016) 23-29; G. Tamasi, M. Casolaro, A. Magnani, A. Sega, L. Chiasserini, L. Messori, C. Gabbiani, S. M. Valiandi, M. A. Jakupec, B. K. Keppler, M. B. Hursthouse, R. Cini, New platinum-oxicam complexes as anti-cancer drugs. Synthesis, characterization, release studies from smart hydrogels, evaluation of reactivity with selected proteins and cytotoxic activity in vitro, J. Inorg. Biochem. 104 (2010) 799-814; J. Pracharova, T. Saltarella, T. R. Muchova, S. Scintilla, V. Novohradsky, O. Novakova, F. P. Intini, C. Pacifico, G. Natile, P. Ilik, V. Brabec, J. Kasparkova, Novel Antitumor Cisplatin and Transplatin Derivatives Containing 1-Methyl-7-Azaindole: Synthesis, Characterization, and Cellular Responses, J. Med. Chem. 2015, 58, 847-859; F. P. Intini, J. Zajac, V. Novohradsky, T. Saltarella, C. Pacifico, V. Brabec, G. Natile, J. Kasparkova, Novel Antitumor Platinum(II) Conjugates Containing the Nonsteroidal Anti-inflammatory Agent Diclofenac: Synthesis and Dual Mechanisms of Antiproliferative Effects, Inorg. Chem. 56 (2017) 1483-1497; M. Y. Jomaa, S. Ahmad, A. A. A. Selimanc, S. A. Popoola, A. R. Shaikha, A. A. Al-Saadi, G. Bhatia, J. Singh, A. A. Isab, Synthesis, spectroscopic characterization and in vitro cytotoxic as well as docking studies of cis-diammine platinum (II) complexes of thiones, Inorg. Chim. Acta, 484 (2019) 347-351; L. Cai, C. Yu, L. Ba, Q. Liu, Y. Qian, B. Yang, C. Gao, Anticancer platinum-based complexes with non-classical Structures, Appl. Organomet. Chem. 32 (2018) e4228; and C. Marzano, A. Trevisan, L. Giovagnini, D. Fregona, Synthesis of a new platinum(II) complex: anticancer activity and nephrotoxicity in vitro, Toxicol. in Vitro 16 (2002) 413-419, each incorporated herein by reference in their entirety]. Despite these recent advances, there is still a need to develop new platinum complexes with improved antitumor potency and lower therapy-induced toxicity.

In view of the forgoing, one objective of the present disclosure is to provide mixed ligand platinum(II) complexes containing dicyclopentadiene and dithiocarbamate, pharmaceutical compositions containing the platinum(II) complexes, and a method of treating cancer with the platinum(II) complexes.

BRIEF SUMMARY OF THE INVENTION

According to a first aspect, the present disclosure relates to a platinum(II) complex of formula (I)

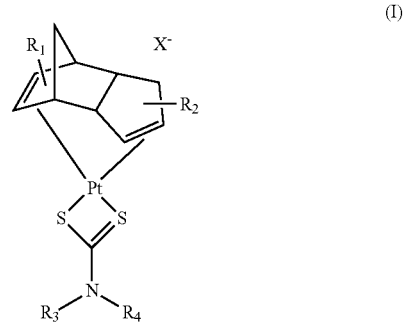

or a salt thereof, a solvate thereof, a tautomer thereof, a stereoisomer thereof, or a mixture thereof, wherein (i) $R_1$ and $R_2$ are each independently a hydrogen or an optionally substituted $C_1$ to $C_3$ alkyl, (ii) $R_3$ and $R_4$ are each independently selected from the group consisting of a hydrogen, an optionally substituted alkyl, an optionally substituted cycloalkyl, an optionally substituted arylalkyl, and an optionally substituted aryl, and (iii) X is an anion.

In one embodiment, $R_1$ and $R_2$ are each independently hydrogen, methyl, or ethyl.

In one embodiment, $R_1$ and $R_2$ are each hydrogen.

In one embodiment, $R_3$ and $R_4$ are each independently a $C_1$ to $C_8$ alkyl or a $C_7$ to $C_{12}$ arylalkyl.

In one embodiment, $R_3$ and $R_4$ are each methyl, ethyl, or benzyl.

In one embodiment, the anion is a hexafluorophosphate ion, a trifluoromethanesulfonate ion, a tetrafluoroborate ion, a perchlorate ion, or a halide ion.

In one embodiment, the anion is hexafluorophosphate ion.

In one embodiment, the platinum(II) complex of formula (I) is selected from the group consisting of

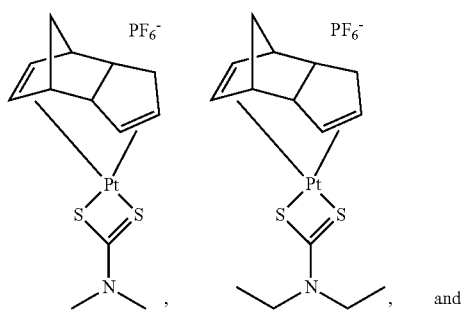

-continued

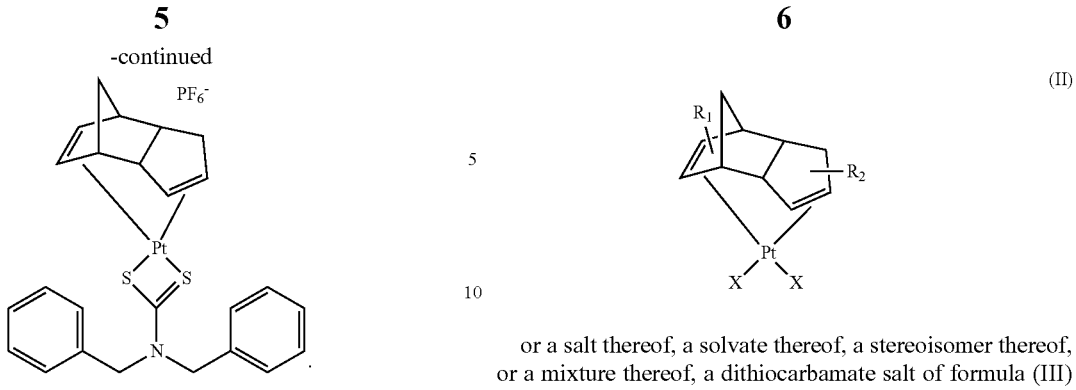

According to a second aspect, the present disclosure relates to a pharmaceutical composition containing the platinum(II) complex of formula (I) of the first aspect and a pharmaceutically acceptable carrier and/or excipient.

In one embodiment, the pharmaceutical composition contains 0.5-50 μM of the platinum(II) complex of formula (I) relative to a total volume of the pharmaceutical composition.

In one embodiment, the pharmaceutically acceptable carrier and/or excipient is at least one selected from the group consisting of a buffer, an inorganic salt, a fatty acid, a vegetable oil, a synthetic fatty ester, a surfactant, and a polymer.

In one embodiment, the platinum(II) complex of formula (I) is

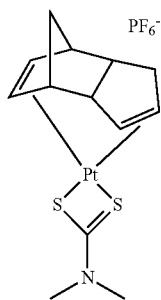

According to a third aspect, the present disclosure relates to a method for treating a proliferative disorder. The method involves administering the pharmaceutical composition of the second aspect to a subject in need of therapy.

In one embodiment, 0.01-50 mg/kg of the platinum(II) complex of formula (I) is administered per body weight of the subject.

In one embodiment, the proliferative disorder is cancer.

In a further embodiment, the cancer is lung cancer and/or cervical cancer.

In a further embodiment, the cancer is resistant to at least one platinum-based chemotherapy drug.

In one embodiment, the platinum-based chemotherapy drug is cisplatin.

In one embodiment, the subject is a mammal.

According to a fourth aspect, the present disclosure relates to a method of synthesizing the platinum(II) complex of formula (I) of the first aspect. The method involves mixing a platinum(II) compound of formula (II)

(II)

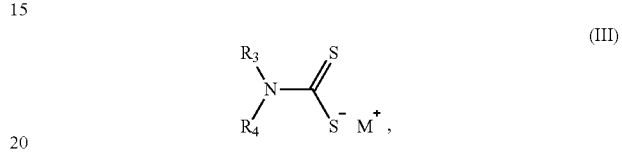

or a salt thereof, a solvate thereof, a stereoisomer thereof, or a mixture thereof, a dithiocarbamate salt of formula (III)

(III)

$$\underset{R_4}{\overset{R_3}{\diagdown}} N \overset{S}{-} \underset{S^- \; M^+}{\overset{\|}{C}} ,$$

and a solvent, thereby forming the platinum(II) complex of formula (I), wherein (i) $R_1$ and $R_2$ are each independently a hydrogen or an optionally substituted $C_1$ to $C_3$ alkyl, (ii) $R_3$ and $R_4$ are each independently selected from the group consisting of a hydrogen, an optionally substituted alkyl, an optionally substituted cycloalkyl, an optionally substituted arylalkyl, and an optionally substituted aryl, (iii) X is an anion, and (iv) M is an alkali metal cation.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
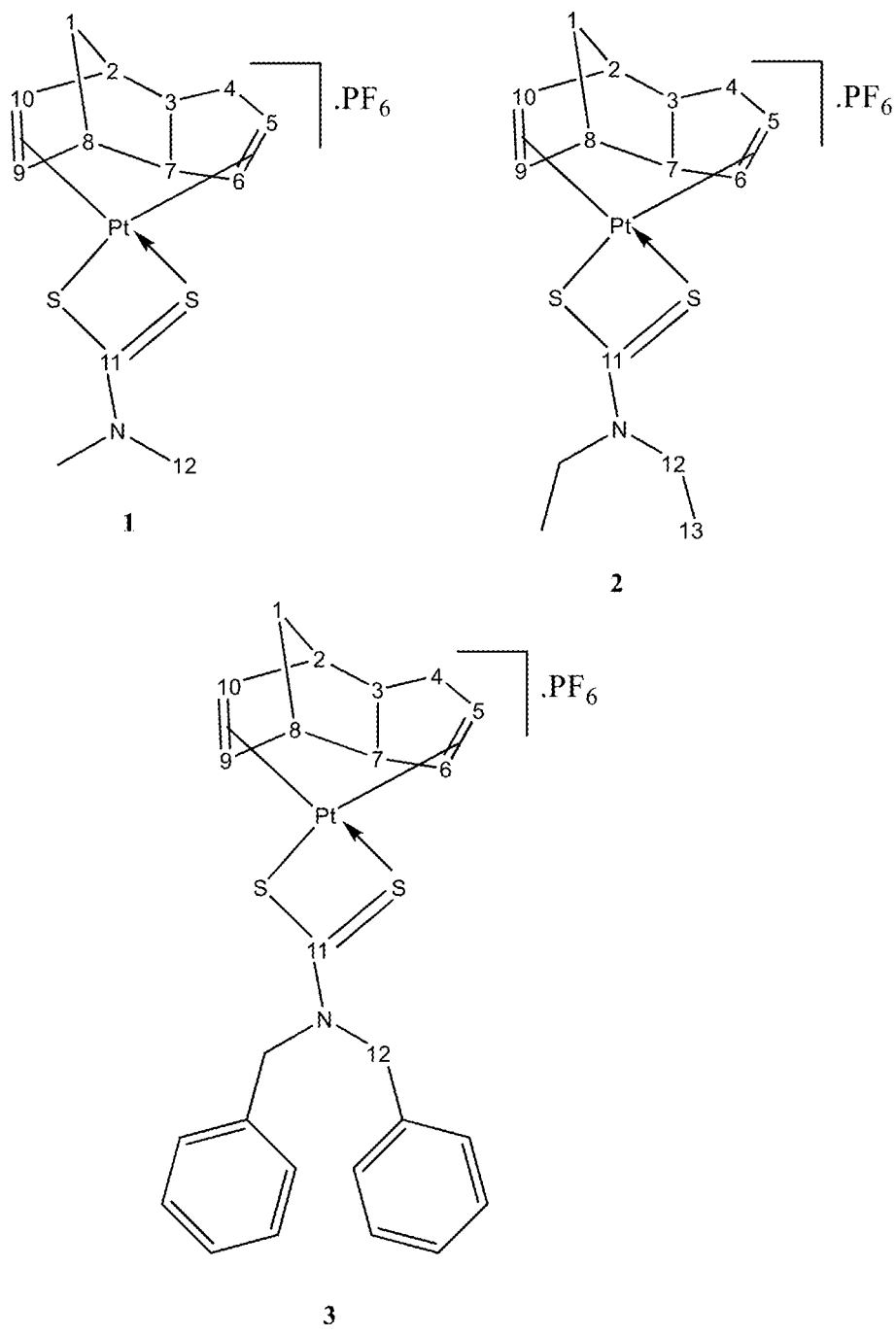
FIG. 1 illustrates chemical structures of platinum(II) complexes 1, 2, and 3.
Figure 2A:
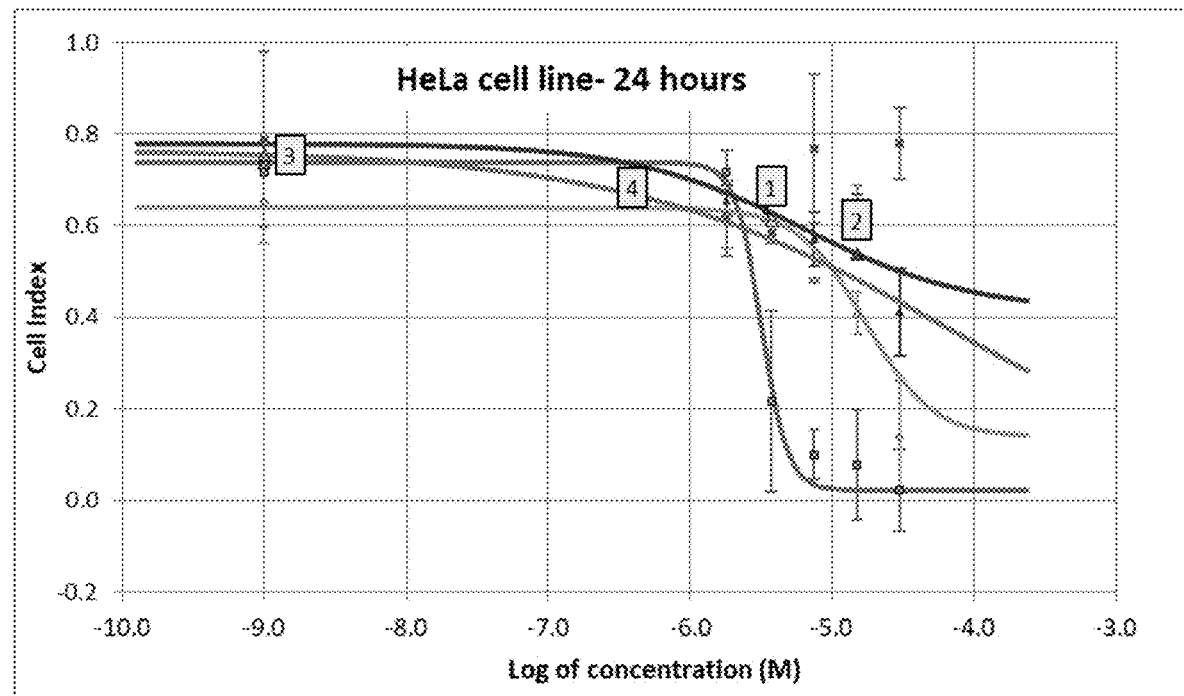
FIG. 2A is a graph illustrating cell indexes of HeLa cells after a 24 h treatment with platinum(II) complexes 1 ("1"), 2 ("2"), and 3 ("3"), and cisplatin ("4") at different concentrations.
Figure 2B:
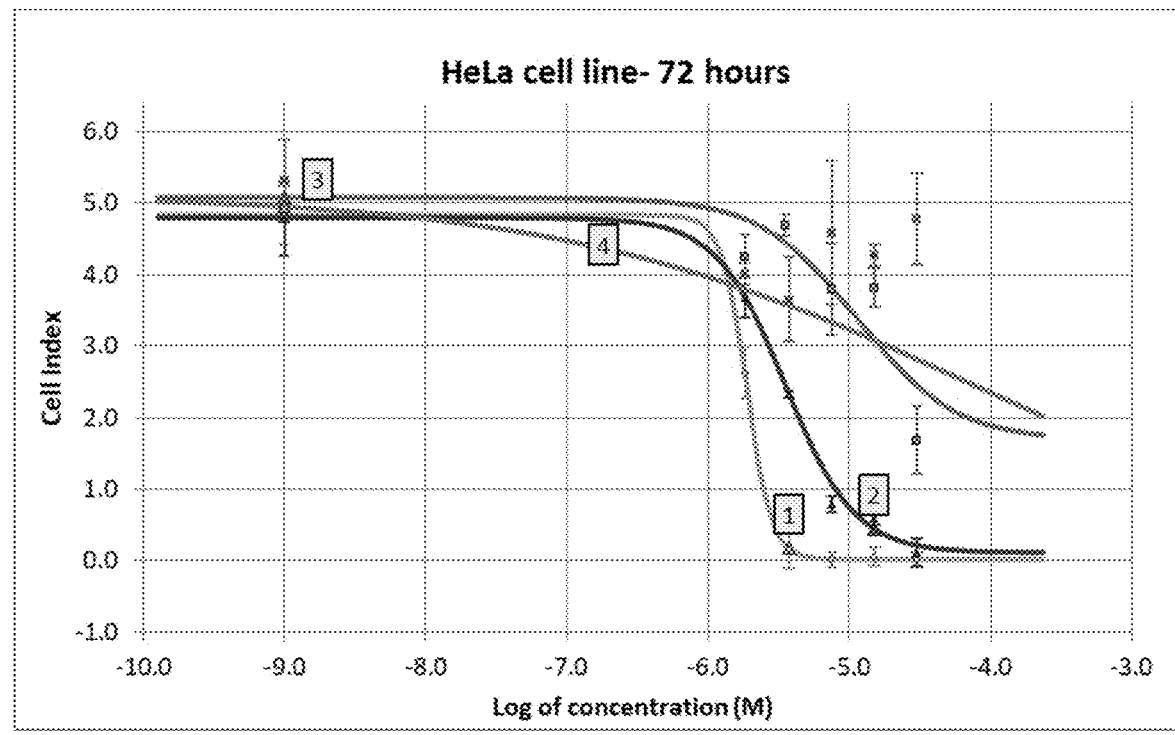
FIG. 2B is a graph illustrating cell indexes of HeLa cells after a 72 h treatment with platinum(II) complexes 1 ("1"), 2 ("2"), and 3 ("3"), and cisplatin ("4") at different concentrations.
Figure 2C:
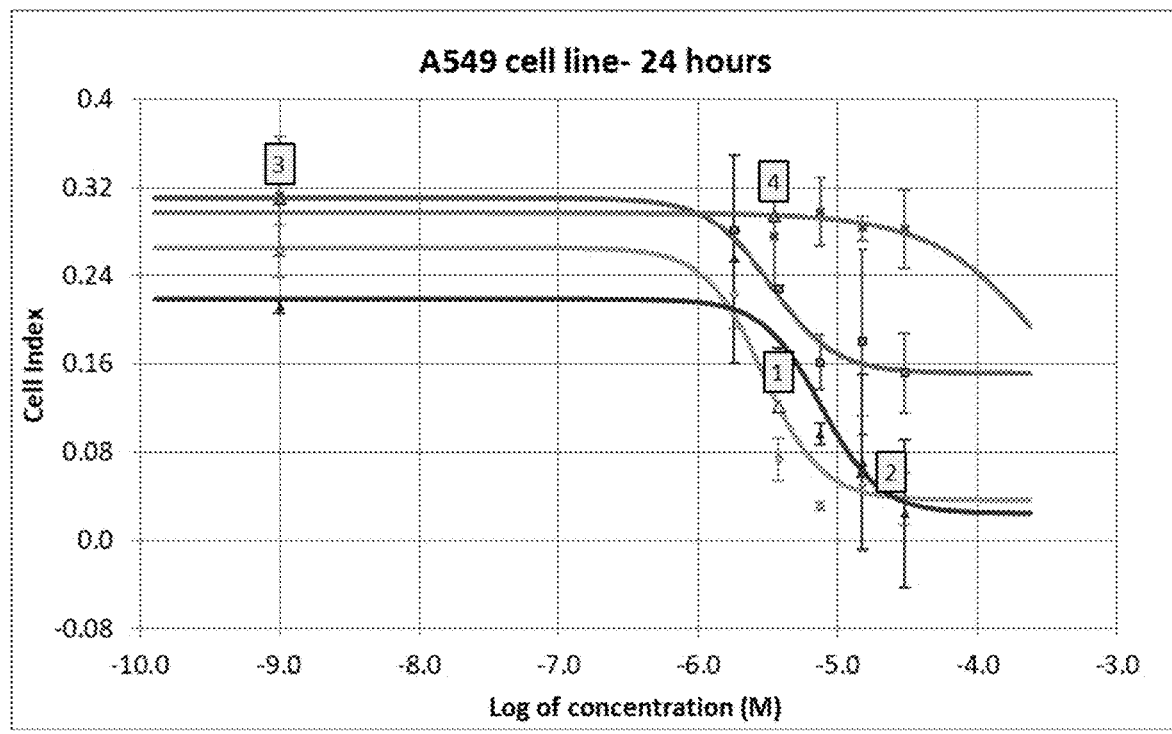
FIG. 2C is a graph illustrating cell indexes of A549 cells after a 24 h treatment with platinum(II) complexes 1 ("1"), 2 ("2"), and 3 ("3"), and cisplatin ("4") at different concentrations.
Figure 2D:
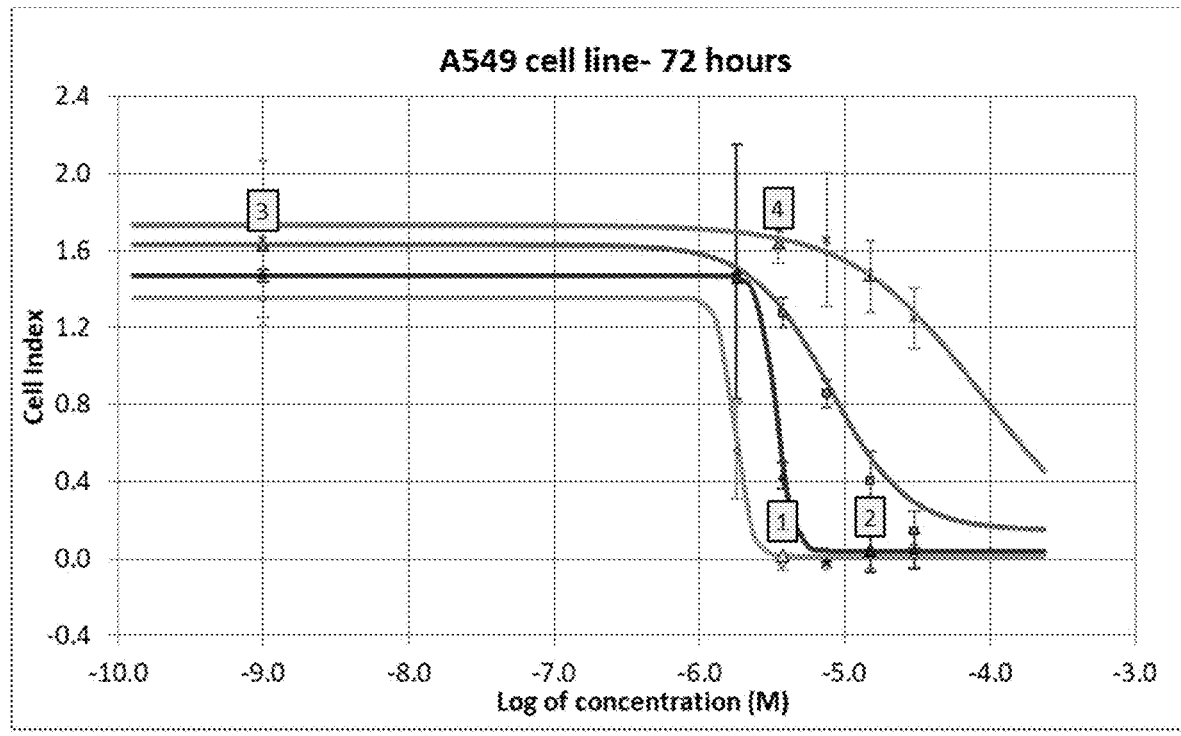
FIG. 2D is a graph illustrating cell indexes of A549 cells after a 72 h treatment with platinum(II) complexes 1 ("1"), 2 ("2"), and 3 ("3"), and cisplatin ("4") at different concentrations.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "complex", "compound", and "product" are used interchangeably, and are intended to refer to a chemical entity, whether in the solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, iso-propanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those of ordinary skill in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomers refer to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. It should be understood that all conformers, rotamers, or conformational isomer forms, insofar as they may exist, are included within the present disclosure.

In terms of the present disclosure, stereoisomers of the ring systems, stereogenic centers, and the like can all be present in the compounds, and all such stable isomers are contemplated in the present disclosure. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

As used herein, the term "alkyl" unless otherwise specified refers to both branched and straight chain saturated aliphatic primary, secondary, and/or tertiary hydrocarbons of typically $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups and cycloalkenyl groups such as cyclobutenyl, cyclopentenyl, and cyclohexenyl are included in the definition of cycloalkyl as used in the present disclosure.

The term "aryl", as used herein, and unless otherwise specified, refers to a substituent that is derived from an aromatic hydrocarbon (arene) that has had a hydrogen atom removed from a ring carbon atom. The aryl group may be a carbocyclic aromatic monocyclic group containing 6 carbon atoms which may be further fused to one or more 5- or 6-membered carbocyclic group which may be aromatic, saturated or unsaturated. Aryl includes, but is not limited to, phenyl, biphenyl, 1-naphthyl, 2-naphthyl, anthracenyl, and the like.

The term "arylalkyl", as used herein, refers to a straight or branched chain alkyl moiety (as defined above) that is substituted by an aryl group (as defined above), and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "halide", as used herein, means fluoride, chloride, bromide, and iodide.

The term "halogen", as used herein, means fluoro, chloro, bromo and iodo.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanoylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, unsubstituted amide (i.e. —CONH$_2$), substituted amide (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof. The substituents may themselves be optionally substituted, and may be either unprotected, or protected as necessary, as known to those of ordinary skill in the art, for example, as taught in Greene, et al., "Protective Groups in Organic Synthesis", John Wiley and Sons, Second Edition, 1991, hereby incorporated by reference in its entirety.

The present disclosure is intended to include all isotopes of atoms occurring in the present compounds. Isotopes include those atoms having the same atomic number but different mass numbers. By way of general example, and without limitation, isotopes of hydrogen include deuterium and tritium, and isotopes of carbon include $^{13}$C and $^{14}$C. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

Sulfur-containing biomolecules (e.g., amino acids) have high affinity to drugs containing heavy metals such as platinum, generating strong and irreversible metal-protein adducts, which can cause nephrotoxicity and deactivate the drugs by preventing them from reaching the biological DNA targets [C. Marzano, A. Trevisan, L. Giovagnini, D. Fregona, Synthesis of a new platinum(II) complex: anticancer activity and nephrotoxicity in vitro, Toxicol. in Vitro 16 (2002) 413-419; J. Reedjik, Why Does Cisplatin Reach Guanine-N7 with Competing S-Donor Ligands Available in the Cell?, Chem. Rev. 99 (1999) 2499; J. Bogojeski, Z. D. Bugarcic, R. Puchta, R. van Eldik, Eur. J. Inorg. Chem. (2010) 5439-5445; A. R. Timerbaev, C. G. Hartinger, S. S. Aleksenko, B. K. Keppler, Chem. Rev. 106 (2006) 2224; X. Wang, Z. Guo, The role of sulfur in platinum anticancer chemotherapy, Anticancer Agents Med. Chem. 7 (2007) 19-34; M. Sooriyaarachchi, M. A. Gibson, B. D. S. Lima, J. Gailer, Can. J. Chem. 94 (2016) 360-366; E. Volckova, L. P. Dudones, R. N. Bose, HPLC determination of binding of cisplatin to DNA in the presence of biological thiols: implications of dominant platinum-thiol binding to its anticancer action, Pharm. Res. 19 (2002) 124-131; and K. Lemma, S. K. C. Elmroth and L. I. Elding, Substitution reactions of [Pt(dien)Cl]$^+$, [Pt(dien)(GSMe)]$^{2+}$, cis-[PtCl$_2$(NH$_3$)$_2$] and cis-[Pt(NH$_3$)$_2$(GSMe)$_2$]$^{2+}$ (GSMe=S-methylglutathione) with some sulfur-bonding chemoprotective agents, J. Chem. Soc., Dalton Trans. (2002) 1281-1286, each incorporated herein by reference in their entirety]. In order to modulate the side effect, sulfur-containing compounds including thiols and dithiocarbamates are often administered after treatment with platinum-based drugs [K. Lemma, S. K. C. Elmroth and L. I. Elding, Substitution reactions of [Pt(dien)Cl]$^+$, [Pt(dien)(GSMe)]$^{2+}$, cis-[PtCl$_2$(NH$_3$)$_2$] and cis-[Pt(NH$_3$)$_2$(GSMe)$_2$]$^{2+}$ (GSMe=S-methylglutathione) with some sulfur-bonding chemoprotective agents, J. Chem. Soc., Dalton Trans. (2002) 1281-1286, incorporated herein by reference in its entirety]. In particular, dithiocarbamates have been evaluated as chemoprotectants against cisplatin induced nephrotoxicity. Through its sulfur atoms, dithiocarbamate chelates the platinum moiety via nucleophilic attack, thereby stabilizing the platinum-containing drugs and reducing formations of enzyme-thiol complexes [K. Lemma, S. K. C. Elmroth and L. I. Elding, Substitution reactions of [Pt(dien) Cl]$^+$, [Pt(dien)(GSMe)]$^{2+}$, cis-[PtCl$_2$(NH$_3$)$_2$] and cis-[Pt(NH$_3$)$_2$(GSMe)$_2$]$^{2+}$ (GSMe=S-methylglutathione) with some sulfur-bonding chemoprotective agents, J. Chem. Soc., Dalton Trans. (2002) 1281-1286; and D. L. Bodenner, P. C. Dedon, P. C., Keng and R. F. Borch, Effect of Diethyldithiocarbamate on cis-Diamminedichloroplatinum(II)-induced Cytotoxicity, DNA Cross-Linking, and γ-Glutamyl Transpeptidase Inhibition, Cancer Res. 46 (1986) 2745-2750, each incorporated herein by reference in their entirety].

Platinum(II) dithiocarbamate complexes have been reported to possess antitumor properties and in some cases their cytotoxic activity was greater than cisplatin [C. Marzano, A. Trevisan, L. Giovagnini, D. Fregona, Synthesis of a new platinum(II) complex: anticancer activity and nephrotoxicity in vitro, Toxicol. in Vitro 16 (2002) 413-419; G. Faraglia, D. Fregona, S. Sitran, L. Giovagnini, C. Marzano, F. Baccichetti, U. Casellato, R. Graziania, Platinum(II) and palladium(II) complexes with dithiocarbamates and amines: synthesis, characterization and cell assay, J. Inorg. Biochem. 83 (2001) 31-40; D. Fregona, L. Giovagnini, L. Ronconi, C. Marzano, A. Trevisan, S. Sitran, B. Biondi, F. Bordin, Pt(II) and Pd(II) derivatives of ter-butylsarcosinedithiocarbamate: Synthesis, chemical and biological characterization and in vitro nephrotoxicity, J. Inorg. Biochem. 93 (2003) 181-189; C. Marzano, D. Fregona, F. Baccichetti, A. Trevisan, L. Giovagnini, F. Bordin, Cytotoxicity and DNA damage induced by a new platinum(II) complex with pyridine and dithiocarbamate, Chem.-Biol. Interact. 140 (2002) 215-229; M. K. Amir, Zia-ur-Rehman, F. Hayat, S. Z. Khan, G. Hogarth, T. Kondratyuk, J. M. Pezzutode, M. N. Tahir, Monofunctional platinum(II) dithiocarbamate complexes: synthesis, characterization and anticancer activity, RSC Advances, 6 (2016) 110517-110524, each incorporated herein by reference in their entirety]. Chemical structural studies on platinum(II) dithiocarbamate complexes usually revealed a square-planar geometry having dithiocarbamate ligands coordinated to a platinum metal center in a bidentate mode [M. K. Amir, Zia-ur-Rehman, F. Hayat, S. Z. Khan, G. Hogarth, T. Kondratyuk, J. M. Pezzutode, M. N. Tahir, Monofunctional platinum(II) dithiocarbamate complexes: synthesis, characterization and anticancer activity, RSC Advances, 6 (2016) 110517-110524; D. C. Onwudiwe, J. N. Mugo, M. Hrubaru, E. Hosten, Bis diallyl dithiocarbamate Pt(II) complex: Synthesis, characterization, thermal decomposition studies, and experimental and theoretical studies on its structure, J. Sulfur Chem. 36 (2015) 36-47; A. T. Baker, M. T. Emett, The Crystal and Molecular Structures of Bis(diethyldithiocarbamato)platinum(II) and Bis[di(2-hydroxyethyl)dithiocarbamato]platinum(II), Aust. J. Chem. 45 (1992) 429-434; and A. A. Isab, M. A. J. Ali, S. Sharif, I. U. Khan, S. K. Kang, T. Khalid, M. Saleem, S. Ahmad, Synthesis, Crystal Structure and Antimicrobial Studies of Chlorido(dimethylsulfoxide-κS)(pyrrolidinedithiocarbamato-κ$^2$S,S$'$)platinum(II), Inorg. Chem. Commun. 14 (2011) 1962-1965, each incorporated herein by reference in their entirety]. However, in [PtCl(pyrrolidinedithiocarbamate)]$_5$ the dithiocarbamate ligand coordinated to the platinum center in a tridentate fashion via chelating and bridging modes [D. Montagner, P. J. S. Miguel, Unique Pt5 metallacycle: [Pt$^{II}$Cl(pyrrolidinedithiocarbamate)]$_5$, Dalton Trans. 40 (2011) 10809-10811, incorporated herein by reference in its entirety].

Compared to Werner-type platinum complexes, organoplatinum compounds are much less investigated for anticancer applications [M. V. Babak, M. Pfaffeneder-Kmen, S. M. Meier-Menches, M. S. Legina, S. Theiner, C. Licona, C. Orvain, M. Hejl, M. Hanif, M. A. Jakupec, B. K. Keppler, C. Gaiddon, C. G. Hartinger, Rollover Cyclometalated Bipyridine Platinum Complexes as Potent Anticancer Agents: Impact of the Ancillary Ligands on the Mode of Action, Inorg. Chem. 57 (2018) 2851-2864; M. Clemente, I. H. Polat, J. Albert, R. Bosque, M. Crespo, J. Granell, C. Lopez, M. Martinez, J. Quirante, R. Messeguer, C. Calvis, J. Badia, L. Baldomá, M. Font-Bardia, M. Cascante, Platinacycles Containing a Primary Amine Platinum(II) Compounds for Treating Cisplatin-Resistant Cancers by Oxidant Therapy, Organometallics, 2018; M. Frezza, Q. P. Dou, Y. Xiao, H. Samouei, M. Rashidi, F. Samari, B. Hemmateenejad, In Vitro and In Vivo Antitumor Activities and DNA Binding Mode of Five Coordinated Cyclometalated Organoplatinum (II) Complexes Containing Biphosphine Ligands, J. Med. Chem., 2011, 54 (18), pp 6166-6176; A. Escola, M. Crespo, J. Quirante, R. Cortes, A. Jayaraman, J. Badia, L. Baldomá, T. Calvet, M. Font-Bardia, M. Cascante, Exploring the Scope of [Pt2(4-FC6H4)4(μ-SEt2)2] as a Precursor for New Organometallic Platinum(II) and Platinum(IV) Antitumor Agents, Organometallics 2014, 33, 1740-1750; K. Butsch, S. Elmas, N. Sen Gupta, R. Gust, F. Heinrich, A. Klein, Y. von Mering, M. Neugebauer, I. Ott, M. Schafer, H. Scherer, T. Schurr, Organoplatinum(II) and palladium(II) complexes of Nucleobases and their derivatives, Organometallics 28 (2009) 3906-3915; A. Klein, A. Luning, I. Ott, L. Hamel, M. Neugebauer, K. Butsch, V. Lingen, F. Heinrich, S. Elmas, Organometallic palladium and platinum complexes with strongly donating alkyl coligands-Synthesis, structures, chemical and cytotoxic properties, J. Organomet. Chem 695 (2010) 1898-1905; T. T. Da, N. T. T. Chi, V. Meervelt, P. M. Kimpende, N. H. Dinh, Synthesis, structure and properties of two series of platinum(II) complexes containing methyleugenol or chelating methyleugenol and amine, Polyhedron 85 (2015)2 104-109; T. T. Da, L. T. H. Hai, L. V. Meervelt, N. H. Dinh, Synthesis, structure, and in vitro cytotoxicity of organoplatinum(II) complexes containing aryl olefins and quinolones, J. Coord. Chem. 68 (2015) 3525-3536; A. E. Patterson, J. J. Miller, B. A. Miles, E. L. Stewart, J.-M. E. J. Melanson, C. M. Vogels, A. M. Cockshutt, A. Decken, P. Morin Jr., S. A. Westcott, Synthesis, characterization and anticancer properties of (salicylaldiminato)platinum(II) complexes, Inorg. Chim. Acta 415 (2014) 88-94; S. Jean, K. Cormier, A. E. Patterson, C. M. Vogels, A. Decken, G. A. Robichaud, S. Turcotte, S. A. Westcott, Synthesis, characterization and anticancer properties of organometallic Schiff base platinum(II) complexes, Can. J. Chem. 93 (2015) 1140-1146; N. Chekkat, G. Dahm, E. Chardon, M. Wantz, J. Sitz, M. Decossas, O. Lambert, B. Frisch, R. Rubbiani, G. Gasser, G. Guichard, S. Fournel, S. Bellemin-Laponnaz, N-Heterocyclic Carbene-Polyethylenimine Platinum Complexes with Potent in Vitro and in Vivo Antitumor Efficacy, Bioconjugate Chem. 27 (2016) 1942-1948; J. K. Muenzner, T. Rehm, B. Biersack, A. Casini, I. A. de Graaf, P. Worawutputtapong, A. Noor, R. Kempe, V. Brabec, J. Kasparkova: Adjusting the DNA interaction and anticancer activity of Pt(II)N-heterocyclic carbene complexes by steric shielding of the trans leaving group. J. Med. Chem. 58 (2015) 6283-6292; J. J. Zhang, C. M. Che, I. Ott, Caffeine derived platinum(II)N-heterocyclic carbene complexes with multiple anti-cancer activities. J. Organ Chem. 782 (2015) 37-41; G. Alves, L. Morel, M. El-Ghozzi, D. Avignant, B. Legeret, L. Nauton, F. Cisnetti, A. Gautier, A platinum Chugaev carbene complex as a potent anticancer agent, Chem. Commun., 2011, 47, 7830-7832, each incorporated herein by reference in their entirety]. Several organoplatinum compounds, including platinum-alkyl/alkenyl [M. V. Babak, M. Pfaffeneder-Kmen, S. M. Meier-Menches, M. S. Legina, S. Theiner, C. Licona, C. Orvain, M. Hejl, M. Hanif, M. A. Jakupec, B. K. Keppler, C. Gaiddon, C. G. Hartinger, Rollover Cyclometalated Bipyridine Platinum Complexes as Potent Anticancer Agents: Impact of the Ancillary Ligands on the Mode of Action, Inorg. Chem. 57 (2018) 2851-2864; M. Clemente, I. H. Polat, J. Albert, R. Bosque, M. Crespo, J. Granell, C. Lopez, M. Martinez, J. Quirante, R. Messeguer, C. Calvis, J. Badia, L. Baldomá, M. Font-Bardia, M. Cascante, Platinacycles Containing a Primary Amine Platinum(II) Compounds for Treating Cisplatin-Resistant Cancers by Oxidant Therapy, Organometallics, 2018; M. Frezza, Q. P. Dou, Y. Xiao, H. Samouei, M. Rashidi, F. Samari, B. Hemmateenejad, In Vitro and In Vivo Antitumor Activities and DNA Binding Mode of Five Coordinated Cyclometalated Organoplatinum(II) Complexes Containing Biphosphine Ligands, J. Med. Chem., 2011, 54 (18), pp 6166-6176; A. Escola, M. Crespo, J. Quirante, R. Cortes, A. Jayaraman, J. Badia, L. Baldomá, T. Calvet, M. Font-Bardia, M. Cascante, Exploring the Scope of [Pt2(4-FC6H4)4(µ-SEt2)2] as a Precursor for New Organometallic Platinum(II) and Platinum(IV) Antitumor Agents, Organometallics 2014, 33, 1740-1750; K. Butsch, S. Elmas, N. Sen Gupta, R. Gust, F. Heinrich, A. Klein, Y. von Mering, M. Neugebauer, I. Ott, M. Schafer, H. Scherer, T. Schurr, Organoplatinum(II) and palladium(II) complexes of Nucleobases and their derivatives, Organometallics 28 (2009) 3906-3915; and A. Klein, A. Luning, I. Ott, L. Hamel, M. Neugebauer, K. Butsch, V. Lingen, F. Heinrich, S. Elmas, Organometallic palladium and platinum complexes with strongly donating alkyl coligands-Synthesis, structures, chemical and cytotoxic properties, J. Organomet. Chem 695 (2010) 1898-1905, each incorporated herein by reference in their entirety], platinum-alkene [K. Butsch, S. Elmas, N. Sen Gupta, R. Gust, F. Heinrich, A. Klein, Y. von Mering, M. Neugebauer, I. Ott, M. Schafer, H. Scherer, T. Schurr, Organoplatinum(II) and palladium(II) complexes of Nucleobases and their derivatives, Organometallics 28 (2009) 3906-3915; A. Klein, A. Luning, I. Ott, L. Hamel, M. Neugebauer, K. Butsch, V. Lingen, F. Heinrich, S. Elmas, Organometallic palladium and platinum complexes with strongly donating alkyl coligands-Synthesis, structures, chemical and cytotoxic properties, J. Organomet. Chem 695 (2010) 1898-1905; T. T. Da, N. T. T. Chi, V. Meervelt, P. M. Kimpende, N. H. Dinh, Synthesis, structure and properties of two series of platinum (II) complexes containing methyleugenol or chelating methyleugenol and amine, Polyhedron 85 (2015)2 104-109; T. T. Da, L. T. H. Hai, L. V. Meervelt, N. H. Dinh, Synthesis, structure, and in vitro cytotoxicity of organoplatinum(II) complexes containing aryl olefins and quinolones, J. Coord. Chem. 68 (2015) 3525-3536; A. E. Patterson, J. J. Miller, B. A. Miles, E. L. Stewart, J.-M. E. J. Melanson, C. M. Vogels, A. M. Cockshutt, A. Decken, P. Morin Jr., S. A. Westcott, Synthesis, characterization and anticancer properties of (salicylaldiminato)platinum(II) complexes, Inorg. Chim. Acta 415 (2014) 88-94; and S. Jean, K. Cormier, A. E. Patterson, C. M. Vogels, A. Decken, G. A. Robichaud, S. Turcotte, S. A. Westcott, Synthesis, characterization and anticancer properties of organometallic Schiff base platinum(II) complexes, Can. J. Chem. 93 (2015) 1140-1146, each incorporated herein by reference in their entirety] and platinum-carbene complexes, have been studied to understand their structural, spectroscopic, and cytotoxic properties, reaction kinetics, interactions with DNA and other biomolecules, as well as apoptosis mechanisms. For example, Westcott et al. evaluated the in vitro antitumor properties of salicylaldimine-based platinum-alkene complexes against human brain, breast, and renal cancer cells, and demonstrated that the growth inhibitory activities of these complexes could be altered by varying the salicylaldimine group [A. E. Patterson, J. J. Miller, B. A. Miles, E. L. Stewart, J.-M. E. J. Melanson, C. M. Vogels, A. M. Cockshutt, A. Decken, P. Morin Jr., S. A. Westcott, Synthesis, characterization and anticancer properties of (salicylaldiminato)platinum(II) complexes, Inorg. Chim. Acta 415 (2014) 88-94; and S. Jean, K. Cormier, A. E. Patterson, C. M. Vogels, A. Decken, G. A. Robichaud, S. Turcotte, S. A. Westcott, Synthesis, characterization and anticancer properties of organometallic Schiff base platinum(II) complexes, Can. J. Chem. 93 (2015) 1140-1146, each incorporated herein by reference in their entirety].

Although several platinum-diene complexes have been described in publications [A. Klein, A. Luning, I. Ott, L. Hamel, M. Neugebauer, K. Butsch, V. Lingen, F. Heinrich, S. Elmas, Organometallic palladium and platinum complexes with strongly donating alkyl coligands-Synthesis, structures, chemical and cytotoxic properties, J. Organomet. Chem 695 (2010) 1898-1905; S. Otto, Structure and solution behavior of cyclooctadiene complexes of platinum(II), Inorg. Chim. Acta 363 (2010) 3316-3320; J. L. Butikofer, E. W. Kalberer, W. C. Schuster, D. M. Roddick, The Crystal Structure of Dichloro(norbornadiene)platinum(II): A Comparison to Dichloro(cyclooctadiene)platinum(II), Acta Cryst. C (2004) m353-m354; G. Avitabile, P. Ganis, U. Lepore, A. Panunzi, Inorg. Chim. Acta, 7 (1973) 329; G. B. Deacon, B. M. Gatehouse, K. T. Nelson-Reed, Preparations of chloro(diene) polyfluorophenylplatinum(II) complexes and the structure of chloro(dicyclopentadiene)pentafluorophenylplatinum(II), J. Organomet. Chem. 359 (1989) 267-

283; and D. A. de Vekki, V. M. Uvarov, V. K. Bel'skii, N. K. Skvortsov, Reaction of Platinum Complexes with (+)-α-Pinene and (+)-Limonene. Synthesis, Molecular Structure, and Catalytic Activity of Dichloro($\eta^4$-[p-mentha-1,8{9}-diene])platinum(II), Russ. J. Gen. Chem. 76 (2006) 1288-1294, each incorporated herein by reference in their entirety], few provided evidence of antitumor properties [K. Butsch, S. Elmas, N. Sen Gupta, R. Gust, F. Heinrich, A. Klein, Y. von Mering, M. Neugebauer, I. Ott, M. Schafer, H. Scherer, T. Schurr, Organoplatinum(II) and palladium(II) complexes of Nucleobases and their derivatives, Organometallics 28 (2009) 3906-3915; and A. Klein, A. Luning, I. Ott, L. Hamel, M. Neugebauer, K. Butsch, V. Lingen, F. Heinrich, S. Elmas, Organometallic palladium and platinum complexes with strongly donating alkyl coligands-Synthesis, structures, chemical and cytotoxic properties, J. Organomet. Chem 695 (2010) 1898-1905, each incorporated herein by reference in their entirety].

According to a first aspect, the present disclosure relates to platinum(II) complexes having a platinum(II) atom coordinated in a mixed ligand environment. Preferably, the platinum(II) atom is coordinated by a dicyclopentadiene ligand and a dithiocarbamate ligand. The coordination of each of the dicyclopentadiene and dithiocarbamate ligand to a platinum(II) atom is preferably in a bidentate fashion. In preferred embodiments, the platinum(II) complex is mononuclear (i.e., contains one platinum(II) atom), with a single dicyclopentadiene ligand and a single dithiocarbamate ligand coordinated to the platinum(II) atom in a bidentate fashion via platinum-π backbondings and platinum-sulfur interactions, respectively.

The present disclosure provides a platinum(II) complex of formula (I)

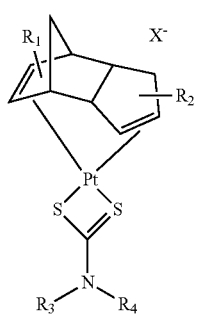

(I)

or a salt thereof, a solvate thereof, a tautomer thereof, a stereoisomer thereof, or a mixture thereof.

The generic structure of a dicyclopentadiene with carbon position numbering is illustrated below:

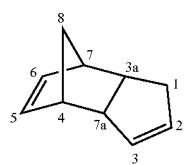

dicyclopentadiene

Exemplary dicyclopentadiene ligands include, but are not limited to,

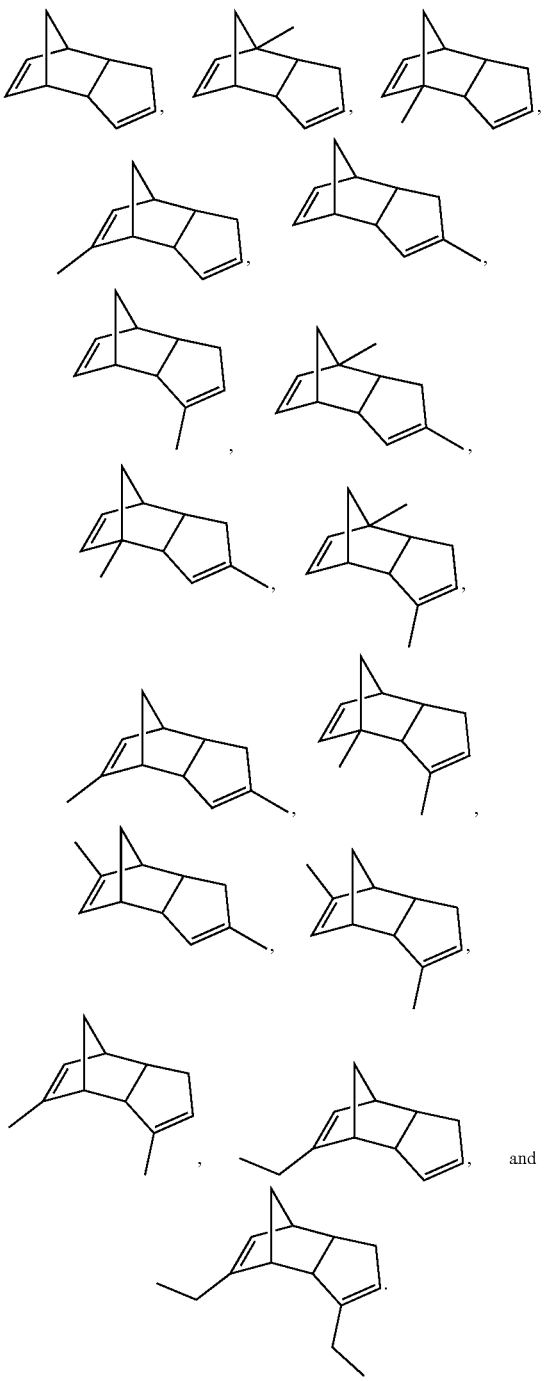

and

The backbone of a dicyclopentadiene as a free ligand may adopt endo or exo conformation. Preferably, the backbone of the dicyclopentadiene ligands of the platinum(II) complex of formula (I) is arranged in endo conformation.

$R_1$ and $R_2$ of the dicyclopentadiene ligand of the platinum (II) complex formula (I) may be the same or different. Preferably $R_1$ and $R_2$ are the same. $R_1$ and $R_2$ are each independently a hydrogen or an optionally substituted $C_1$ to $C_3$ alkyl, or a $C_2$ alkyl. In preferred embodiments, $R_1$ and $R_2$ are each independently hydrogen, methyl, or ethyl. Most preferably, $R_1$ and $R_2$ are each hydrogen. $R_1$ may be located at any position of the five-membered ring containing carbon atoms C4, C5, C6, C7, and C8 (as illustrated above) of the dicyclopentadiene ligand. R₂ may be located at any position of the five-membered ring containing carbon atoms C1, C2, C3, C(3a), and C(7a) (as illustrated above) of the dicyclopentadiene ligand. Exemplary non-substituted and substituted dicyclopentadine ligands are listed above.

R₃ and R₄ of the dithiocarbamate ligand of formula (I) may be the same or different. Preferably R₃ and R₄ are the same. R₃ and R₄ are each independently selected from the group consisting of a hydrogen, an optionally substituted alkyl, an optionally substituted cycloalkyl, an optionally substituted arylalkyl, and an optionally substituted aryl. In some embodiments, R₃ and R₄ are each independently an optionally substituted alkyl or an optionally substituted arylalkyl. Preferably, R₃ and R₄ are each independently a $C_1$ to $C_8$ alkyl, preferably a $C_2$ to $C_7$ alkyl, preferably a $C_3$ to $C_6$ alkyl, preferably a $C_4$ to $C_5$ alkyl, or a $C_7$ to $C_{12}$ arylalkyl, preferably a $C_8$ to $C_{11}$ arylalkyl, preferably a $C_9$ to $C_{10}$ arylalkyl. In preferred embodiments, R₃ and R₄ are the same, and are each methyl, ethyl, or benzyl. Most preferably, R₃ and R₄ are each methyl.

In the platinum(II) complex of formula (I), X is an anion which is outside of the coordination sphere of the complex, i.e., not directly bound to the platinum atom. The term "anion" means a negatively charged ion including, but not limited to, halides, such as fluoride, chloride, bromide, and iodide, nitrate, sulfate, phosphate, methanesulfonate, ethanesulfonate, p-toluenesulfonate, salicylate, malate, maleate, succinate, tartrate, citrate, acetate, perchlorate, trifluoromethanesulfonate, acetylacetonate, tetrafluoroborate, hexafluorophosphate, and hexafluoroacetylacetonate. In preferred embodiments, the anion X of platinum(II) complex of formula (I) is at least one selected from the group consisting of a hexafluorophosphate ion, a trifluoromethanesulfonate ion, a tetrafluoroborate ion, a perchlorate ion, and a halide ion. In a most preferred embodiment, the anion X is a hexafluorophosphate ion.

In preferred embodiment, the platinum(II) complex of formula (I) is selected from the group consisting of

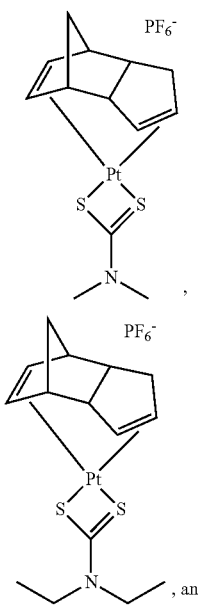, and

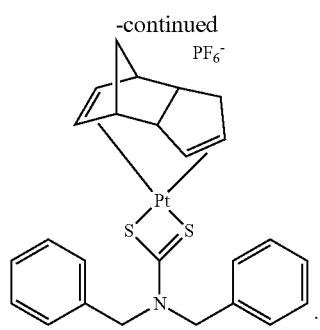

Most preferably, the platinum(II) complex of formula (I) is

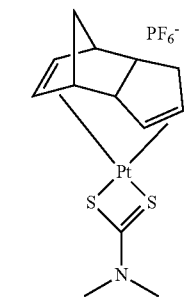

The dicyclopentadiene ligand of the above listed platinum (II) complexes may preferably adopt endo conformation.

The platinum(II) complexes of the present disclosure may be prepared by any complexation method know to those of ordinary skill in the art. The following methods set forth below are provided for illustrative purposes and not intended to limit the scope of the disclosure.

For example, the platinum(II) complex of formula (I) may be synthesized by mixing a platinum(II) compound of formula (II)

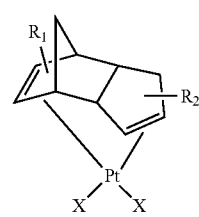

(II)

or a salt thereof, a solvate thereof, a stereoisomer thereof, or a mixture thereof, a dithiocarbamate salt of formula (III)

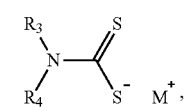

(III)

and a solvent, thereby forming the platinum(II) complex, wherein R₁, R₂, R₃, R₄ and X are specified above.

Prior to the mixing, the method disclosed herein may further involve a ligand-exchange reaction when X is not the desired anion according to formula (I). For example, when the desired anion is hexafluorophosphate, a platinum(II)

compound of formula (II) where X is chloride or bromide may be subjected to an ligand-exchange reaction with a desirable salt comprising hexafluorophosphate such as silver hexafluorophosphate, ammonium hexafluorophosphate, potassium hexafluorophosphate, and lithium hexafluorophosphate, preferably silver hexafluorophosphate, using methods known to those of ordinary skill in the art (see Example 2).

M is an alkali metal cation (e.g. sodium, potassium, cesium, lithium, silver, and rubidium), an ammonium cation, an optionally substituted alkylammonium cation (e.g. dimethylammonium, diethylammonium, triethylammonium, tetrabutylammonium, tributylmethylammonium, trioctylmethylammonium, and benzylammonium cations), an optionally substituted arylammonium cation (e.g. phenylammonium, and diphenylammonium cations), or an optionally substituted alkylarylammonium cation (e.g. dimethylphenylammonium, and trimethylphenylammonium cations). Most preferably, M is sodium cation.

Exemplary dithiocarbamate salts include, but are not limited to, sodium dimethyldithiocarbamate, potassium dimethyldithiocarbamate, sodium diethyldithiocarbamate, potassium diethyldithiocarbamate, and sodium dibenzyldithiocarbamate.

In a preferred embodiment, mixing the platinum(II) compound of formula (II) and the dithiocarbamate salt of formula (III) is performed in one or more organic solvents to form a reaction mixture. Exemplary organic solvents include, but are not limited to, aromatic solvents (e.g., benzene, ethylbenzene, o-xylene, m-xylene, p-xylene, and mixtures of xylenes, toluene, mesitylene, anisole, 1,2-dimethoxybenzene, α,α,α,-trifluoromethylbenzene, fluorobenzene, heavy aromatic naptha), alkane solvents (e.g., pentane, cyclopentane, hexanes, cyclohexane, heptanes, cycloheptane, octanes), ethers (e.g. diethyl ether, tetrahydrofuran, 1,4-dioxane, tetrahydropyran, t-butyl methyl ether, cyclopentyl methyl ether, di-isopropyl ether), glycol ethers (e.g. 1,2-dimethoxyethane, diglyme, triglyme), chlorinated solvents (e.g. chlorobenzene, dichloromethane, 1,2-dichloroethane, 1,1-dichloroethane, chloroform, carbon tetrachloride), ester solvents (e.g. ethyl acetate, propyl acetate), ketones (e.g. acetone, butanone), formamides/acetamides (e.g., formamide, dimethyl formamide, dimethyl acetamide), monoalcohols (e.g., methanol, ethanol, propanol, isopropanol, n-butanol, isobutanol, n-pentanol, n-hexanol, terpineol, menthol, prenol, 3-methyl-3-buten-1-ol, 2-ethyl-1-hexanol, 2-ethyl-1-butanol, 2-propylheptan-1-ol, 2-butyl-1-octanol, benzyl alcohol), polyalcohols including glycols (e.g., ethylene glycol, diethylene glycol, triethylene glycol, tetraethylene glycol, propylene glycol, dipropylene glycol, 1,3-propanediol, 1,3-butanediol, 1,4-butanediol, 1,6-hexanediol, glycerol, pentaerythritol, manitol, sorbitol), as well as mixtures thereof. Preferably a mixture of a chlorinated solvent (e.g., dichloromethane) and a monoalcohol (e.g., ethanol) is used as the solvent, for example at a vol:vol ratio of 1:1 to 4:1, preferably 3:2 to 3:1, or about 2:1.

Typically, the platinum(II) compound of formula (II) is present in the reaction mixture at a concentration in a range of 10-1,000 mM, preferably 25-500 mM, preferably 50-400 mM, preferably 75-200 mM, preferably 90-150 mM, or about 100 mM. In a related embodiment, the dithiocarbamate salt of formula (III) is present in the reaction mixture at a concentration in a range of 10-1,000 mM, preferably 25-500 mM, preferably 50-400 mM, preferably 75-200 mM, preferably 90-150 mM, or about 100 mM. In one or more embodiments, a molar ratio of the platinum(II) compound to the dithiocarbamate salt is in the range of 1:2 to 2:1, preferably 2:3 to 3:2, preferably 1:1.2 to 1.2:1, or about 1:1.

The reaction mixture may be agitated (e.g., using an agitator, a vortexer, a rotary shaker, a magnetic stirrer, a centrifugal mixer, an overhead stirrer) at a temperature of 4-50° C., 10-40° C., 15-35° C., or 20-25° C. for any amount of time sufficient for complexation, typically from 0.5 to 12 hours, preferably from 1 to 8 hours, preferably 3-6 hours, or about 4 hours.

The reaction mixture may then be filtered to collect a second solution. The second solution may be concentrated by evaporating the solvent to yield a crude platinum(II) complex of formula (I). The crude platinum(II) complex of formula (I) may be further purified by methods known to those skilled in the art, for example, aqueous workup, extraction with solvents, distillation, recrystallization, column chromatography, and high-performance liquid chromatography (HPLC). Precipitation/crystallization of the platinum(II) complex may occur, and the precipitate/crystals may be collected using methods known to those of ordinary skill in the art such as filtration.

According to a further aspect, the present disclosure relates to a pharmaceutical composition containing the platinum(II) complex of formula (I) of the first aspect and a pharmaceutically acceptable carrier and/or excipient.

As used herein, a "composition" or a "pharmaceutical composition" refers to a mixture of the active ingredient with other chemical components, such as pharmaceutically acceptable carriers and excipients. One purpose of a composition is to facilitate administration of the compound disclosed herein in any of its embodiments to a subject. Pharmaceutical compositions of the present disclosure may be manufactured by processes well known in the art, e.g., by means of conventional mixing, dissolving, granulating, dragee-making, levigating, emulsifying, encapsulating, entrapping or lyophilizing processes. Depending on the intended mode of administration (oral, parenteral, or topical), the composition can be in the form of solid, semi-solid or liquid dosage forms, such as tablets, suppositories, pills, capsules, powders, liquids, or suspensions, preferably in unit dosage form suitable for single administration of a precise dosage.

The term "active ingredient", as used herein, refers to an ingredient in the composition that is biologically active, for example, one or more of the Pt(II) complexes represented by formula (I), salts thereof, solvates thereof, tautomers thereof, stereoisomers thereof, or any mixtures thereof. In some embodiments, other active ingredients in addition to the complexes of the current disclosure may be incorporated into a pharmaceutical composition, for example, a second active ingredient which is chemically distinct from the platinum(II) complexes.

In one or more embodiments, the platinum(II) complex of formula (I) of the pharmaceutical composition is selected from the group consisting of

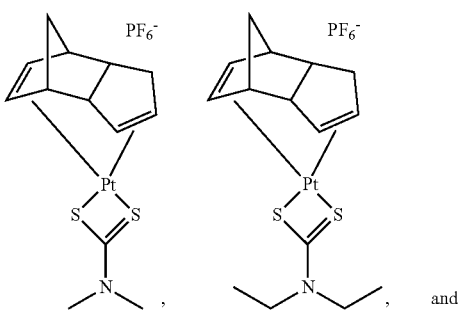

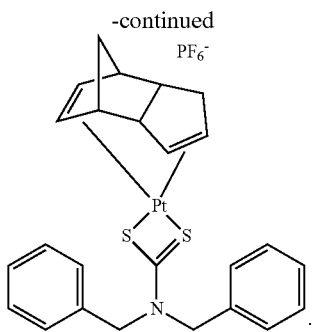

Most preferably, the platinum(II) complex of formula (I) of the pharmaceutical composition is

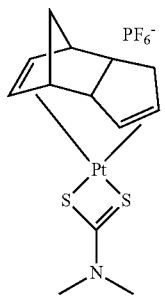

When the platinum(II) complexes are administered as pharmaceuticals, to humans and animals, they can be given per se or as a pharmaceutical composition containing the active ingredient(s) in combination with a pharmaceutically acceptable carrier and/or excipient. The pharmaceutical composition may contain at least 0.0001 wt. %, at least 0.001 wt. %, at least 0.01 wt. %, at least 0.05 wt. %, at least 0.1 wt. %, at least 0.5 wt. %, at least 5 wt. %, at least 10 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, at least 60 wt. %, at least 65 wt. %, at least 70 wt. %, at least 75 wt. %, at least 80 wt. %, at least 85 wt. %, at least 90 wt. %, at least 95 wt. %, at least 99 wt. %, or at least 99.9 wt. % of the platinum(II) complex of formula (I) relative to a total weight of the pharmaceutical composition. For example, when formulated as a solution, the pharmaceutical composition may contain 0.1-100 µM of the platinum(II) complex of formula (I) relative to a total volume of the pharmaceutical composition, preferably 0.5-50 µM, preferably 1-45 µM, preferably 2-40 µM, preferably 3-35 µM, preferably 4-30 µM, preferably 5-25 µM, preferably 6-20 µM, preferably 7-15 µM, preferably 8-12 µM, preferably 10-11 µM of the platinum(II) complex relative to a total volume of the pharmaceutical composition.

In some embodiments, the active ingredient of the current disclosure, e.g. the platinum(II) complex of formula (I), a salt thereof, a solvate thereof, a tautomer thereof, a stereoisomer thereof, or any mixtures thereof, provides utility as an anticancer agent in reducing the viability of cancer cells derived from human cancer cell lines including, but not limited to, lung cancer cell lines (e.g., A549, NCI-H460, SHP-77, COR-L23/R, NCI-H69/LX20); cervical cancer cell lines (e.g., HeLa, ME-180, R-ME-180); ovarian cancer cell lines (e.g., NCI-ADR/RES, OVCAR-03, A2780, A2780cis, OV7, PE023); breast cancer cell lines (e.g., MDA-MB-231, MCF-7, SK-BR-3, T47D, VP303); stomach cancer cell lines (e.g., N87, SNU-16, SNU-5, SNU-1, KATO III, AGS); colon/colorectal cancer cell lines (e.g., HCT-116, CACO-2, HT-29, HCT15, MDST8, GP5d, DLD1, SW620, SW403, T84); liver cancer cell lines (e.g., HepG2, PLC/PRF/5, THLE-3, C3A, SNU-182, SNU-398, SNU-387, SNU-423, SNU-475, SNU-449, and Hep 3B2.1-7); prostate cancer cell lines (e.g., DU145, PC-3); leukemia cell lines (e.g., HL-60, CESS, CCRF-CEM, CEM/C1, KASUMI-1, ARH-77); brain tumor cell lines (e.g., U251); renal cancer cell lines (e.g., 786-0); skin cancer or melanoma cell lines (e.g., UACC-62, C32TG, A375, MCC26); and bone cancers such as osteosarcoma cell lines (e.g., MG-63). Preferably, the active ingredient of the current disclosure, e.g. the platinum(II) complex of formula (I), a salt thereof, a solvate thereof, a tautomer thereof, a stereoisomer thereof, or any mixtures thereof, provides utility as an anticancer agent in reducing the viability of cancer cells derived from lung cancer cell lines (e.g., A549, NCI-H460, SHP-77, COR-L23/R, NCI-H69/LX20), and cervical cancer cell lines (e.g., HeLa, ME-180, R-ME-180).

In some embodiments, the cancer cells are collected from a human patient who is at risk of having, is suspected of having, has been diagnosed with, or is being monitored for recurrence of at least one type of cancer, preferably lung cancer, and/or cervical cancer.

In preferred embodiments, the active ingredient of the present disclosure, e.g., the platinum(II) complexes of formula (I), a salt thereof, a solvate thereof, a tautomer thereof, a stereoisomer thereof, or any mixtures thereof, may provide utility as an anticancer agent in reducing viability of cancer cells derived from human cancer cell lines which are resistant to, or which are susceptible to becoming resistant to, other therapeutic agents/chemotherapy agents such as platinum-based chemotherapy drugs including, but not limited to, cisplatin, carboplatin, and oxaliplatin. In at least one embodiment, the cancer cells are cisplatin-resistant cancer cells. These cells may be generated by culturing cancer cells with low doses of cisplatin in order to build their resistance to cisplatin while maintaining cell viability. Examples of cisplatin-resistant cancer cells include, but are not limited to, cisplatin resistant cervical cancers (e.g., R-ME-180), A549 cisplatin-resistant lung cancer cells, MCF-7 cisplatin-resistant breast cancer cells, A2780cis cisplatin-resistant ovarian cancer cells, and SGC7901cis cisplatin-resistant gastrointestinal cancer cells.

In some embodiments, the ability of the active ingredient to reduce the viability of cancer cells may be determined by contacting the pharmaceutical composition with the cancer cells and then performing cell viability assays. Methods of such assays include, but are not limited to, sulforhodamine-B (SRB) assay, ATP test, Calcein AM assay, clonogenic assay, ethidium homodimer assay, Evans blue assay, 2',7'-dichlorofluorescin diacetate (DCFDA) or 2',7'-dichlorodihydrofluorescein diacetate (H2DCFDA) staining assay, fluorescein diacetate hydrolysis/propidium iodide staining assay, annexin V/fluorescein isothiocyanate (FITC)/propidium iodide staining assay, flow cytometry, Formazan-based assays (MTT, XTT), green fluorescent protein assay, lactate dehydrogenase (LDH) assay, methyl violet assay, propidium iodide assay, Resazurin assay, trypan blue assay, 4',6'-diamidino-2-phenylindole (DAPI) assay, TUNEL assay, a fluorochrome-labeled inhibitors of caspases (FLICA)-based assay, primary(1°) colonosphere formation assay, thioredoxin reductase assay, 20S proteasome activity assay, and in vitro scratch assay (for cell migration analysis).

In one preferred embodiment, the cell viability assay is performed using xCELLigence® RTCA DP instrument, available from ACEA Biosciences, San Diego, Calif., USA. In another preferred embodiment, a lactate dehydrogenase (LDH) assay and/or an in vitro scratch assay is used.

As used herein, the term "cytotoxic effective amount" refers to a concentration of the active ingredient that reduces the viability of the cancer cells by at least 5%, at least 10%, at least 15%, at least 20%, at least 30%, at least 40%, at least 50%, at least 60%, at least 70%, at least 80% or at least 90%, relative to cancer cells not treated with the active ingredient. The reduction in viability may occur no more than 10 days, no more than 7 days, no more than 5 days, no more than 3 days, or no more than 2 days after the active ingredient is contacted with the cancer cells. In one embodiment, the cytotoxic effective amount may be the $IC_{50}$ which is a concentration of an active ingredient which causes the death of 50% of cellular population of the cancer cells in 6-72 hours, 12-48 hours, or about 24 hours.

In one embodiment, the $IC_{50}$ of the presently disclosed platinum(II) complexes, the salt thereof, the solvate thereof, the tautomer thereof, the stereoisomer thereof, or mixtures thereof against lung cancer cells (e.g. A549 cells) and cervical cancer cells (e.g. HaLa cells) is less than 100 μM, preferably less than 75 μM, preferably less than 50 μM, preferably less than 30 μM, preferably less than 10 μM, preferably less than 5 μM, preferably less than 2 μM, for example, from 0.1 to 25 μM, preferably from 0.5 to 20 μM, preferably from 1 to 15 μM, preferably from 2 to 10 μM, preferably from 3 to 8 μM, preferably from 4 to 7 μM, preferably from 5 to 6 μM.

In some embodiments, other active ingredients in addition to the platinum(II) complexes of the current disclosure may be incorporated into the pharmaceutical composition. In one embodiment, the pharmaceutical composition includes an additional active ingredient that is chemically distinct from the platinum(II) complex of formula (I), such as a chemotherapeutic agent or an anticancer agent, for the treatment or prevention of neoplasm, of tumor or cancer cell division, growth, proliferation and/or metastasis in the subject; induction of death or apoptosis of tumor and/or cancer cells; and/or any other forms of proliferative disorder.

The additional active ingredient may be an anticancer agent and may include, but is not limited to, at least one of a mitotic inhibitor; an alkylating agent; an antimetabolite; a cell cycle inhibitor; an enzyme; a topoisomerase inhibitor; a biological response modifier; an anti-hormone; a tubulin inhibitor; a tyrosine-kinase inhibitor; an antiangiogenic agent such as MMP-2, MMP-9 and COX-2 inhibitor; an anti-androgen; a platinum coordination complex (cisplatin, oxaliplatin, carboplatin); a substituted urea such as hydroxyurea; a methylhydrazine derivative; an adrenocortical suppressant, e.g., mitotane, aminoglutethimide; a hormone and/or hormone antagonist such as the adrenocorticosteriods (e.g., prednisone), progestins (e.g., hydroxyprogesterone caproate), an estrogen (e.g., diethylstilbestrol); an antiestrogen such as tamoxifen; androgen, e.g., testosterone propionate; and an aromatase inhibitor, such as anastrozole, and AROMASIN (exemestane).

Exemplary anticancer agents include, but are not limited to, tubulin binding agents including paclitaxel, epothilone, docetaxel, discodermolide, etoposide, vinblastine, vincristine, teniposide, vinorelbine, and vindesine; tyrosine-kinase inhibitors including imatinib, nilotinib, dasatinib, bosutinib, ponatinib, and bafetinib; alkylating antineoplastic agents including busulfan, carmustine, chlorambucil, cyclophosphamide, cyclophosphamide, dacarbazine, ifosfamide, lomustine, mechlorethamine, melphalan, mercaptopurine, procarbazine; antimetabolites including cladribine, cytarabine, fludarabine, gemcitabine, pentostatin, 5-fluorouracil, clofarabine, capecitabine, methotrexate, thioguanine; cytotoxic antibiotics including daunorubicin, doxorubicin, idarubicin, mitomycin, actinomycin, epirubicin; topoisomerase inhibitors including irinotecan, mitoxantrone, topotecan, and mixtures thereof.

As used herein, other non-cancerous proliferative disorders that may also be treated by the currently disclosed pharmaceutical composition include, but are not limited to, atherosclerosis, rheumatoid arthritis, psoriasis, idiopathic pulmonary fibrosis, scleroderma, cirrhosis of the liver, lymphoproliferative disorder, other disorders characterized by epidermal cell proliferation such as verruca (warts), and dermatitis. The active ingredient of the current disclosure may also exhibit other therapeutic activities such as antimicrobial (e.g. antibacterial, antifungal, antiviral, antimycobacterial), antimalarial, pesticidal, antioxidant, as well as anti-inflammatory efficacies.

As used herein, a "pharmaceutically acceptable carrier" refers to a carrier or diluent that does not cause significant irritation to an organism, does not abrogate the biological activity and properties of the administered active ingredient, and/or does not interact in a deleterious manner with the other components of the composition in which it is contained. The term "carrier" encompasses any excipient, binder, diluent, filler, salt, buffer, solubilizer, lipid, stabilizer, or other material well known in the art for use in pharmaceutical formulations. The choice of a carrier for use in a composition will depend upon the intended route of administration for the composition. The preparation of pharmaceutically acceptable carriers and formulations containing these materials is described in, e.g. Remington's Pharmaceutical Sciences, 21st Edition, ed. University of the Sciences in Philadelphia, Lippincott, Williams & Wilkins, Philadelphia Pa., 2005, which is incorporated herein by reference in its entirety). Some examples of physiologically acceptable carriers include antioxidants including ascorbic acid; low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as TWEEN® (ICI, Inc.; Bridgewater, N.J.), polyethylene glycol (PEG), and PLURONICS™ (BASF; Florham Park, N.J.). An "excipient" refers to an inert substance added to a composition to further facilitate administration of a compound. Examples, without limitation, of excipients include calcium carbonate, calcium phosphate, various sugars and types of starch, cellulose derivatives, gelatin, vegetable oils, and polyethylene glycols.

In one or more embodiments, the pharmaceutical composition contains 0.1 to 99.9999 wt. %, preferably 1 to 99.999 wt. %, preferably 5 to 99.99 wt. %, preferably 10 to 99.9 wt. %, preferably 15 to 99 wt. %, preferably 20 to 90 wt. %, preferably 30 to 85 wt. %, preferably 40 to 80 wt. %, preferably 50 to 75 wt. %, preferably 60 to 70 wt. % of the pharmaceutically acceptable carrier and/or excipient relative to a total weight of the pharmaceutical composition.

In one or more embodiments, the pharmaceutically acceptable carrier and/or excipient is at least one selected from the group consisting of a buffer, an inorganic salt, a fatty acid, a vegetable oil, a synthetic fatty ester, a surfactant, and a polymer.

Exemplary buffers include, but are not limited to, phosphate buffers, citrate buffer, acetate buffers, borate buffers, carbonate buffers, bicarbonate buffers, and buffers with other organic acids and salts.

Exemplary inorganic salts include, but are not limited to, calcium carbonate, calcium phosphate, disodium hydrogen phosphate, potassium hydrogen phosphate, sodium chloride, zinc oxide, zinc sulfate, and magnesium trisilicate.

Exemplary fatty acids include, but are not limited to, an omega-3 fatty acid (e.g., linolenic acid, docosahexaenoic acid, eicosapentaenoic acid) and an omega-6 fatty acid (e.g., linoleic acid, eicosadienoic acid, arachidonic acid). Other fatty acids, such as oleic acid, palmitoleic acid, palmitic acid, stearic acid, and myristic acid, may be included.

Exemplary vegetable oils include, but are not limited to, avocado oil, olive oil, palm oil, coconut oil, rapeseed oil, soybean oil, corn oil, sunflower oil, cottonseed oil, and peanut oil, grape seed oil, hazelnut oil, linseed oil, rice bran oil, safflower oil, sesame oil, brazil nut oil, carapa oil, passion fruit oil, and cocoa butter.

Exemplary synthetic fatty esters include, without limitation, methyl, ethyl, isopropyl and butyl esters of fatty acids (e.g., isopropyl palmitate, glyceryl stearate, ethyl oleate, isopropyl myristate, isopropyl isostearate, diisopropyl sebacate, ethyl stearate, di-n-butyl adipate, dipropylene glycol pelargonate), $C_{12}$-$C_{16}$ fatty alcohol lactates (e.g., cetyl lactate and lauryl lactate), propylene dipelargonate, 2-ethylhexyl isononoate, 2-ethylhexyl stearate, isopropyl lanolate, 2-ethylhexyl salicylate, cetyl myristate, oleyl myristate, oleyl stearate, oleyl oleate, hexyl laurate, isohexyl laurate, propylene glycol fatty ester, and polyoxyethylene sorbitan fatty ester. As used herein, the term "propylene glycol fatty ester" refers to a monoether or diester, or mixtures thereof, formed between propylene glycol or polypropylene glycol and a fatty acid. The term "polyoxyethylene sorbitan fatty ester" denotes oleate esters of sorbitol and its anhydrides, typically copolymerized with ethylene oxide.

Surfactants may act as detergents, wetting agents, emulsifiers, foaming agents, and dispersants. Surfactants that may be present in the compositions of the present disclosure include zwitterionic (amphoteric) surfactants, e.g., phosphatidylcholine, and 3-[(3-cholamidopropyl)dimethylammonio]-1-propanesulfonate (CHAPS), anionic surfactants, e.g., sodium lauryl sulfate, sodium octane sulfonate, sodium decane sulfonate, and sodium dodecane sulfonate, non-ionic surfactants, e.g., sorbitan monolaurate, sorbitan monopalmitate, sorbitan trioleate, polysorbates such as polysorbate 20 (Tween 20), polysorbate 60 (Tween 60), and polysorbate 80 (Tween 80), cationic surfactants, e.g., decyltrimethylammonium bromide, dodecyltrimethylammonium bromide, tetradecyltrimethylammonium bromide, tetradecyltrimethyl-ammonium chloride, and dodecylammonium chloride, and combinations thereof.

Exemplary polymers include, without limitation, polylactides, polyglycolides, polycaprolactones, polyanhydrides, polyurethanes, polyesteramides, polyorthoesters, polydioxanones, polyacetals, polyketals, polycarbonates, polyorthocarbonates, polyphosphazenes, polyhydroxybutyrates, polyhydroxyvalerates, polyalkylene oxalates, polyalkylene succinates, poly(malic acid), poly(maleic anhydride), a polyvinyl alcohols, and copolymers, terpolymers, or combinations or mixtures therein. The copolymer/terpolymer may be a random copolymer/terpolymer, or a block copolymer/terpolymer.

Depending on the route of administration e.g. oral, parental, or topical, the pharmaceutical composition may be in the form of solid dosage form such as tablets, caplets, capsules, powders, and granules, semi-solid dosage form such as ointments, creams, lotions, gels, pastes, and suppositories, liquid dosage forms such as solutions, and dispersions, inhalation dosage form such as aerosols, and spray, or transdermal dosage form such as patches.

Solid dosage forms for oral administration can include capsules, tablets, pills, powders, and granules. In such solid dosage forms, the active ingredient is ordinarily combined with one or more adjuvants appropriate to the indicated route of administration. If administered per os, the active ingredient can be admixed with lactose, sucrose, starch powder, cellulose esters of alkanoic acids, cellulose alkyl esters, talc, stearic acid, magnesium stearate, magnesium oxide, sodium and calcium salts of phosphoric and sulfuric acids, gelatin, acacia gum, sodium alginate, polyvinylpyrrolidone, and/or polyvinyl alcohol, and then tableted or encapsulated for convenient administration. Such capsules or tablets can contain a controlled-release formulation as can be provided in a dispersion of active compound in hydroxypropylmethyl cellulose. In the case of capsules, tablets, and pills, the dosage forms can also comprise buffering ingredients such as sodium citrate, magnesium or calcium carbonate or bicarbonate. Tablets and pills can additionally be prepared with enteric coatings.

Liquid dosage forms for oral administration can include pharmaceutically acceptable emulsions, solutions, suspensions, syrups, and elixirs containing inert diluents commonly used in the art, such as water. Such compositions can also comprise adjuvants, such as wetting ingredients, emulsifying and suspending ingredients, and sweetening, flavouring, and perfuming ingredients.

For therapeutic purposes, formulations for parenteral administration can be in the form of aqueous or non-aqueous isotonic sterile injection solutions or suspensions. The term "parenteral", as used herein, includes intravenous, intravesical, intraperitoneal, subcutaneous, intramuscular, intralesional, intracranial, intrapulmonal, intracardial, intrasternal, and sublingual injections, or infusion techniques. These solutions and suspensions can be prepared from sterile powders or granules having one or more of the carriers or diluents mentioned for use in the formulations for oral administration.

The active ingredient(s) can be dissolved in aqueous or non-aqueous carriers including, but not limited to, water, ethanol, benzyl alcohol, DMSO, polyethylene glycol, propylene glycol, ethanol, corn oil, cottonseed oil, peanut oil, sesame oil, sodium chloride, and/or various buffers. Other adjuvants and modes of administration are well and widely known in the pharmaceutical art.

Injectable preparations, for example, sterile injectable aqueous or oleaginous suspensions can be formulated according to the known art using suitable dispersing or wetting ingredients and suspending ingredients. The sterile injectable preparation can also be a sterile injectable solution or suspension in a non-toxic parenterally acceptable diluent or solvent, for example, as a solution in 1,3-butanediol. Among the acceptable vehicles and solvents that can be employed are water, Ringer's solution, and isotonic sodium chloride solution. In addition, sterile, fixed oils are conventionally employed as a solvent or suspending medium. For this purpose any bland fixed oil can be employed including synthetic mono- or di-glycerides. In addition, fatty acids, such as oleic acid, find use in the preparation of injectables. Dimethyl acetamide, surfactants including ionic and nonionic detergents, polyethylene glycols can be used. Mixtures of solvents and wetting ingredients such as those discussed above are also useful.

Formulations of the pharmaceutical compositions of the disclosure for rectal or vaginal administration may be presented as a suppository, which may be prepared by mixing one or more platinum(II) complexes with one or more suitable non-irritating excipients or carriers comprising, for example, cocoa butter, polyethylene glycol, a suppository wax or a salicylate, and which is solid at room temperature, but liquid at body temperature and, therefore, will melt in the rectum or vaginal cavity and release the active ingredient(s).

Formulations of the pharmaceutical compositions which are suitable for vaginal administration also include pessaries, tampons, creams, gels, pastes, foams or spray formulations containing such carriers as are known in the art to be appropriate.

Topical administration may involve the use of transdermal administration such as transdermal patches or iontophoresis devices. Formulation of drugs is discussed in, for example, Hoover, J. E. Remington's pharmaceutical sciences, Mack Publishing Co., Easton, Pa., 1975; and Liberman, H. A.; Lachman, L., Eds. Pharmaceutical dosage forms, Marcel Decker, New York, N.Y., 1980, which are incorporated herein by reference in their entirety.

In other embodiments, the pharmaceutical composition having the presently disclosed compound(s), the salt thereof, the solvate thereof, the tautomer thereof, the stereoisomer thereof, or the mixture thereof has different release rates categorized as immediate release and controlled- or sustained-release.

As used herein, immediate release refers to the release of an active ingredient substantially immediately upon administration. In another embodiment, immediate release occurs when there is dissolution of an active ingredient within 1-20 minutes after administration. Dissolution can be of all or less than all (e.g. about 70%, about 75%, about 80%, about 85%, about 90%, about 91%, about 92%, about 93%, about 94%, about 95%, about 96%, about 97%, about 98%, about 99%, about 99.5%, 99.9%, or 99.99%) of the active ingredient. In another embodiment, immediate release results in complete or less than complete dissolution within about 1 hour following administration. Dissolution can be in a subject's stomach and/or intestine. In one embodiment, immediate release results in dissolution of an active ingredient within 1-20 minutes after entering the stomach. For example, dissolution of 100% of an active ingredient can occur in the prescribed time. In another embodiment, immediate release results in complete or less than complete dissolution within about 1 hour following rectal administration. In some embodiments, immediate release is through inhalation, such that dissolution occurs in a subject's lungs.

Controlled-release, or sustained-release, refers to a release of an active ingredient from a composition or dosage form in which the active ingredient is released over an extended period of time. In one embodiment, controlled-release results in dissolution of an active ingredient within 20-180 minutes after entering the stomach. In another embodiment, controlled-release occurs when there is dissolution of an active ingredient within 20-180 minutes after being swallowed. In another embodiment, controlled-release occurs when there is dissolution of an active ingredient within 20-180 minutes after entering the intestine. In another embodiment, controlled-release results in substantially complete dissolution after at least 1 hour following administration. In another embodiment, controlled-release results in substantially complete dissolution after at least 1 hour following oral administration. In another embodiment, controlled-release results in substantially complete dissolution after at least 1 hour following rectal administration. In one embodiment, the pharmaceutical composition described herein is not a controlled-release composition.

According to another aspect, the present disclosure relates to a method for treating a proliferative disorder. The method involves administering a therapeutically effective amount of one or more platinum(II) complexes per se, or the pharmaceutical composition described above to a subject in need of therapy.

In one or more embodiments, the proliferative disorder is cancer. Types of cancers that may be treated with the platinum(II) complexes of the present disclosure include, but are not limited to, cancers of the blood, stomach, breast, colon, brain, bladder, lung, cervix, ovary, rectum, pancreas, skin, prostate gland, spleen, liver, kidney, head, neck, testicle, bone, bone marrow, thyroid gland, and central nervous system. In some embodiments, the platinum(II) complexes of this disclosure can be used for the treatment of any cancer type that fails to undergo apoptosis in a subject. This includes, but is not limited to: solid tumors, including but not limited to carcinomas; sarcomas including Kaposi's sarcoma and osteosarcoma; erythroblastoma; glioblastoma; meningioma; astrocytoma; melanoma; and myoblastoma. Treatment or prevention of non-solid tumor cancers, such as leukemia, is also contemplated by the present disclosure.

Examples of such cancer types include neuroblastoma, intestine carcinoma such as rectum carcinoma, colon carcinoma, familiar adenomatous polyposis carcinoma and hereditary non-polyposis colorectal cancer, esophageal carcinoma, labial carcinoma, larynx carcinoma, hypopharynx carcinoma, tong carcinoma, salivary gland carcinoma, gastric carcinoma, adenocarcinoma, medullary thyroid carcinoma, papillary thyroid carcinoma, renal carcinoma, kidney parenchymal carcinoma, ovarian carcinoma, cervix carcinoma, uterine corpus carcinoma, endometrium carcinoma, chorion carcinoma, pancreatic carcinoma, prostate carcinoma, testis carcinoma, breast carcinoma, urinary carcinoma, melanoma, brain tumors such as glioblastoma, astrocytoma, meningioma, medulloblastoma and peripheral neuroectodermal tumors, Hodgkin lymphoma, non-Hodgkin lymphoma, Bur-kitt lymphoma, acute lymphatic leukemia (ALL), chronic lymphatic leukemia (CLL), acute myeloid leukemia (AML), chronic myeloid leukemia (CML), adult T-cell leukemia lymphoma, diffuse laige B-cell lymphoma (DLBCL), hepatocellular carcinoma, gall bladder carcinoma, bronchial carcinoma, small cell lung carcinoma, non-small cell lung carcinoma, multiple myeloma, basalioma, teratoma, retinoblastoma, choroid melanoma, seminoma, rhabdomyosarcoma, craniopharyngioma, osteosarcoma, chondrosarcoma, myosarcoma, liposarcoma, fibrosarcoma, Ewing sarcoma and plasmocytoma. In preferred embodiments, the cancer that may be treated with the platinum(II) complexes is lung cancer, and/or cervical cancer.

As used herein, the terms "treat", "treatment", and "treating" in the context of the administration of a therapy to a subject in need thereof refer to the reduction or inhibition of the progression and/or duration of a disease (e.g. cancer), the reduction or amelioration of the severity of the disease, and/or the amelioration of one or more symptoms thereof resulting from the administration of one or more therapies. "Treating" or "treatment" of the disease includes preventing the disease from occurring in a subject that may be predisposed to the disease but does not yet experience or exhibit symptoms of the disease (prophylactic treatment), inhibiting the disease (slowing or arresting its development), ameliorating the disease, providing relief from the symptoms or side-effects of the disease (including palliative treatment), and relieving the disease (causing regression of the disease). With regard to the disease, these terms simply mean that one or more of the symptoms of the disease will be reduced. Such terms may refer to one, two, three, or more results following the administration of one, two, three, or more therapies: (1) a stabilization, reduction (e.g. by more than 10%, 20%, 30%, 40%, 50%, preferably by more than 60% of the population of cancer cells and/or tumor size before administration), or elimination of the cancer cells, (2) inhibiting cancerous cell division and/or cancerous cell proliferation, (3) relieving to some extent (or, preferably, eliminating) one or more symptoms associated with a pathology related to or caused in part by unregulated or aberrant cellular division, (4) an increase in disease-free, relapse-free, progression-free, and/or overall survival, duration, or rate, (5) a decrease in hospitalization rate, (6) a decrease in hospitalization length, (7) eradication, removal, or control of primary, regional and/or metastatic cancer, (8) a stabilization or reduction (e.g. by at least 10%, 20%, 30%, 40%, 50%, 60%, 70%, preferably at least 80% relative to the initial growth rate) in the growth of a tumor or neoplasm, (9) an impairment in the formation of a tumor, (10) a reduction in mortality, (11) an increase in the response rate, the durability of response, or number of patients who respond or are in remission, (12) the size of the tumor is maintained and does not increase or increases by less than 10%, preferably less than 5%, preferably less than 4%, preferably less than 2%, (13) a decrease in the need for surgery (e.g. colectomy, mastectomy), and (14) preventing or reducing (e.g. by more than 10%, more than 30%, preferably by more than 60% of the population of metastasized cancer cells before administration) the metastasis of cancer cells.

The term "subject" and "patient" are used interchangeably. As used herein, they refer to any subject for whom or which therapy, including with the compositions according to the present disclosure is desired. In most embodiments, the subject is a mammal, including but not limited to a human, a non-human primate such as a chimpanzee, a domestic livestock such as a cattle, a horse, a swine, a pet animal such as a dog, a cat, and a rabbit, and a laboratory subject such as a rodent, e.g. a rat, a mouse, and a guinea pig. In preferred embodiments, the subject is a human. In at least one embodiment, the subject is a mouse, preferably a male mouse.

As used herein, a subject in need of therapy includes a subject already with the disease, a subject which does not yet experience or exhibit symptoms of the disease, and a subject predisposed to the disease. In preferred embodiments, the subject is a person who is predisposed to cancer, e.g. a person with a family history of cancer. People who (i) smoke or regularly breathe in second-hand smoke, (ii) exposed to carcinogens such as asbestos, radioactive substances (e.g., uranium, radon), and/or (iii) inhaled chemicals or minerals (e.g., arsenic, beryllium, cadmium, silica, vinyl chloride, nickel compounds, chromium compounds, coal products, mustard gas, and chloromethyl ethers) are at a higher risk of contracting lung cancer. People who have been diagnosed with Human papillomavirus (HPV) are at a higher risk of contracting cervical cancer.

In one or more embodiments, the subject refers to a cancer patient who is currently undergoing, or has completed one or more chemotherapy regimens. In some embodiments, the subject has been previously administered/treated with, or is being currently administered/treated with, a thymidylate synthase inhibitor (e.g., capecitabine, fluorouracil (5-FU)), a thymidine phosphorylase (TPase) inhibitor (e.g., tipiracil, trifluridine), a topoisomerase I inhibitor (e.g., irinotecan), a topoisomerase II inhibitor (e.g., doxorubicin), a DNA synthesis inhibitor (e.g., oxaliplatin), a DNA crosslinking agent (e.g., cisplatin), and/or a targeted therapy (e.g., cetuximab, bevacizumab, panitumumab, zivaflibercept, ramucirumab). In preferred embodiments, the subject has been previously administered/treated with, or is being currently administered/treated with, a DNA crosslinking agent (e.g., cisplatin) and developed drug resistance via mechanisms related to decreased intracellular uptake, increased reflux, increased inactivation by sulfhydryl molecules such as glutathione, increased excision of the adducts from DNA by repair pathways, increased lesion bypass, and/or altered expression of regulatory proteins involved in signal transduction pathways that control the apoptotic processes.

In another embodiment, the subject refers to a cancer patient who has been previously administered and/or treated with a platinum-based chemotherapy drug such as Carboplatin, Oxaliplatin, Nedaplatin, Phenanthriplatin, Picoplatin, Satraplatin, Lipoplatin, and cisplatin, and developed resistance to the drug. In some embodiments, the subject refers to a cancer patient who has been previously treated and/or administered with cisplatin and develops cisplatin resistance due to reduced intracellular drug accumulation, overexpression of HER-2/neu and the PI3-K/Akt pathway, increase in DNA damage repair, dysfunction of tumor-suppressor p53, loss of pAMT function, and/or overexpression of antiapoptotic bcl-2. In at least one embodiment, the subject has lung and/or cervical cancer and is currently undergoing, or has completed a cisplatin-based chemotherapy regimen.

The terms "administer", "administering", "administration", and the like, as used herein, refer to the methods that may be used to enable delivery of the active ingredient and/or the composition to the desired site of biological action. Routes or modes of administration are as set forth herein. These methods include, but are not limited to, oral routes, intraduodenal routes, parenteral injection (including intravenous, subcutaneous, intraperitoneal, intramuscular, intravascular, or infusion), topical and rectal administration. Those of ordinary skill in the art are familiar with administration techniques that can be employed with the complexes and methods described herein. In a preferred embodiment, the active ingredient and/or the pharmaceutical composition described herein are administered orally.

The dosage amount and treatment duration are dependent on factors, such as bioavailability of a drug, administration mode, toxicity of a drug, gender, age, lifestyle, body weight, the use of other drugs and dietary supplements, the disease stage, tolerance and resistance of the body to the administered drug, etc., and then determined and adjusted accordingly. The terms "effective amount", "therapeutically effective amount", or "pharmaceutically effective amount" refer to that amount of the active ingredient being administered which will relieve to some extent one or more of the symptoms of the disease being treated. The result can be a reduction and/or alleviation of the signs, symptoms, or causes of a disease, or any other desired alteration of a biological system. An appropriate "effective amount" may differ from one individual to another. An appropriate "effective amount" in any individual case may be determined using techniques, such as a dose escalation study. Typically, an effective amount of the platinum(II) complex disclosed herein is in a range of 0.01-100 mg/kg, preferably 0.05-90 mg/kg, preferably 0.1-80 mg/kg, preferably 0.5-70 mg/kg, preferably 1-60 mg/kg, preferably 2-50 mg/kg, preferably 3-40 mg/kg, preferably 4-30 mg/kg, preferably 5-20 mg/kg, preferably 6-10 mg/kg, preferably 7-8 mg/kg is administered per body weight of the subject. However, in certain embodiments, the effective amount of the platinum(II) complex is less than 0.01 mg/kg or greater than 100 mg/kg.

In treating certain cancers, the best approach is often a combination of surgery, radiotherapy, and/or chemotherapy. Therefore, in at least one embodiment, the pharmaceutical composition is employed in conjunction with radiotherapy. In another embodiment, the pharmaceutical composition is employed with surgery. The radiotherapy and/or surgery may be performed before or after the pharmaceutical composition is administered.

In some embodiments, the platinum(II) complexes of the present disclosure are co-administered with radiation therapy or a second therapeutic agent with cytostatic or antineoplastic activity. Suitable cytostatic chemotherapy compounds include, but are not limited to (i) antimetabolites; (ii) DNA-fragmenting agents, (iii) DNA-crosslinking agents, (iv) intercalating agents (v) protein synthesis inhibitors, (vi) topoisomerase I poisons, such as camptothecin ortopotecan; (vii) topoisomerase II poisons, (viii) microtubule-directed agents, (ix) kinase inhibitors (x) miscellaneous investigational agents (xi) hormones, (xii) hormone antagonists, and (xii) targeted therapies. It is contemplated that platinum(II) complexes of the disclosure may be useful in combination with any known agents falling into the above 13 classes as well as any future agents that are currently in development. In particular, it is contemplated that platinum (II) complexes of the disclosure may be useful in combination with current Standards of Care as well as any that evolve over the foreseeable future. Specific dosages and dosing regimens would be based on physicians' evolving knowledge and the general skill in the art.

Examples of second therapeutic agents include, but are not limited to, a mitotic inhibitor; an alkylating agent; an antimetabolite; a cell cycle inhibitor; an enzyme; a topoisomerase inhibitor; a biological response modifier; an anti-hormone; a tubulin inhibitor; a tyrosine-kinase inhibitor; an antiangiogenic agent such as MMP-2, MMP-9 and COX-2 inhibitor; an anti-androgen; a platinum coordination complex (oxaliplatin, carboplatin, cisplatin); a substituted urea such as hydroxyurea; a methylhydrazine derivative; an adrenocortical suppressant, e.g., mitotane, aminoglutethimide; a hormone and/or hormone antagonist such as the adrenocorticosteriods (e.g., prednisone), progestins (e.g., hydroxyprogesterone caproate), an estrogen (e.g., diethylstilbestrol); an antiestrogen such as tamoxifen; androgen, e.g., testosterone propionate; and an aromatase inhibitor, such as anastrozole, and AROMASIN (exemestane); a thymidylate synthase inhibitor; a thymidine phosphorylase (TPase) inhibitor; a DNA synthesis inhibitor; and/or a targeted therapy. Exemplary second therapeutic agents include, but are not limited to, tubulin binding agents including paclitaxel, epothilone, docetaxel, discodermolide, etoposide, vinblastine, vincristine, teniposide, vinorelbine, and vindesine; tyrosine-kinase inhibitors including imatinib, nilotinib, dasatinib, bosutinib, ponatinib, and bafetinib; alkylating antineoplastic agents including busulfan, carmustine, chlorambucil, cyclophosphamide, cyclophosphamide, dacarbazine, ifosfamide, lomustine, mechlorethamine, melphalan, mercaptopurine, procarbazine; antimetabolites including cladribine, cytarabine, fludarabine, gemcitabine, pentostatin, 5-fluorouracil, clofarabine, capecitabine, methotrexate, thioguanine; cytotoxic antibiotics including daunorubicin, doxorubicin, idarubicin, mitomycin, actinomycin, epirubicin; topoisomerase inhibitors including irinotecan, mitoxantrone, topotecan; thymidine phosphorylase (TPase) inhibitors such as tipiracil and trifluridine; DNA synthesis inhibitors such as oxaliplatin; targeted therapies such as cetuximab, bevacizumab, panitumumab, zivaflibercept, ramucirumab; and mixtures thereof.

The combination therapy is intended to embrace administration of these therapeutic agents in a sequential manner, that is, wherein each therapeutic agent is administered at a different time, as well as administration of these therapeutic agents, or at least two of the therapeutic agents, in a substantially simultaneous manner. Substantially simultaneous administration can be accomplished, for example, by administering to the subject a single dosage form having a fixed ratio of each therapeutic agent or in multiple, single dosage forms for each of the therapeutic agents. Sequential or substantially simultaneous administration of each therapeutic agent can be effected by any appropriate route including, but not limited to, oral routes, intravenous routes, intratumoral routes, intramuscular routes, and direct absorption through mucous membrane tissues. The therapeutic agents can be administered by the same route or by different routes. For example, a first therapeutic agent of the combination selected may be administered by intravenous injection while the other therapeutic agents of the combination may be administered orally. Alternatively, for example, all therapeutic agents may be administered orally or all therapeutic agents may be administered by intravenous injection. Any other administration route combination is also contemplated herein according to the administration routes available for each of the therapeutic agents. Combination therapy also can embrace the administration of the therapeutic agents as described above in further combination with other biologically active ingredients and non-drug therapies (e.g., surgery or radiation treatment). Where the combination therapy further comprises a non-drug treatment, the non-drug treatment may be conducted at any suitable time so long as a beneficial effect from the co-action of the combination of the therapeutic agents and non-drug treatment is achieved. For example, in appropriate cases, the beneficial effect is still achieved when the non-drug treatment is temporally removed from the administration of the therapeutic agents, perhaps by days or even weeks.

A treatment method may comprise administering a pharmaceutical composition containing the platinum(II) complex of the current disclosure in any of its embodiments as a single dose or multiple individual divided doses. In some embodiments, the composition is administered at various dosages (e.g. a first dose with an effective amount of 50 mg/kg and a second dose with an effective amount of 10 mg/kg). In some embodiments, the interval of time between the administration of the composition and the administration of one or more additional therapies may be about 1-5 minutes, 1-30 minutes, 30 minutes to 60 minutes, 1 hour, 1-2 hours, 2-6 hours, 2-12 hours, 12-24 hours, 1-2 days, 2 days, 3 days, 4 days, 5 days, 6 days, 7 days, 1 week, 2 weeks, 3 weeks, 4 weeks, 5 weeks, 6 weeks, 7 weeks, 8 weeks, 9 weeks, 10 weeks, 15 weeks, 20 weeks, 26 weeks, 52 weeks, 11-15 weeks, 15-20 weeks, 20-30 weeks, 30-40 weeks, 40-50 weeks, 1 month, 2 months, 3 months, 4 months, 5 months, 6 months, 7 months, 8 months, 9 months, 10 months, 11 months, 12 months, 1 year, 2 years, or any period of time in between. Preferably, the composition is administered once daily for at least 2 days, at least 5 days, at least 6 days, or at least 7 days. In certain embodiments, the composition and one or more additional therapies are administered less than 1 day, less than 1 week, less than 2 weeks, less than 3 weeks, less than 4 weeks, less than 1 month, less than 2 months, less than 3 months, less than 6 months, less than 1 year, less than 2 years, or less than 5 years apart.

The methods for treating cancer and other proliferative disorders described herein inhibit, remove, eradicate, reduce, regress, diminish, arrest or stabilize a cancerous tumor, including at least one of the tumor growth, tumor cell viability, tumor cell division and proliferation, tumor metabolism, blood flow to the tumor and metastasis of the tumor. In some embodiments, the size of a tumor, whether by volume, weight or diameter, is reduced after the treatment by at least 5%, at least 10%, at least 15%, at least 20%, at least 25%, at least 30%, at least 40%, at least 50%, at least 60%, at least 70%, at least 75%, at least 80%, at least 85%, at least 90%, at least 95%, at least 99%, or 100%, relative to the tumor size before treatment. In other embodiments, the size of a tumor after treatment does not reduce but is maintained the same as the tumor size before treatment. Methods of assessing tumor size include, but are not limited to, CT scan, MRI, DCE-MRI, PET scan, and manual tumor measurement.

In most embodiments, the method further involves measuring a concentration of a biomarker and/or detecting a mutation in a biomarker before and/or after the pharmaceutical composition comprising the compound of the present disclosure is administered. As used herein, the term "biomarker" refers to a characteristic that is objectively measured and evaluated as an indicator of normal biological processes, pathogenic processes or pharmacological responses to a therapeutic intervention. Generic cancer biomarkers include circulating tumor DNA (ctDNA) and circulating tumor cells (CTC). Exemplary biomarkers for lung cancer include, without limitation, CYFRA 21-1 (cytokeratins), EPCAM (epithelial cell adhesion molecule), ProGRP (pro-gastrin-releasing peptide), and CEACAM (carcinoembryonic antigen). Exemplary biomarkers for cervical cancer include, without limitation HPV E6, HPV E7, Mini chromosome maintenance (MCM), Cell division cycle protein 6 ($CDCl_6$), p16$^{INK4A}$, Squamous cell carcinoma antigen (SCC), and Ki-67.

The mutation in the biomarker may be detected by procedures such as restriction fragment length polymorphism (RFLP), polymerase chain reaction (PCR) assay, multiplex ligation-dependent probe amplification (MLPA), denaturing gradient gel electrophoresis (DGGE), single-strand conformation polymorphism (SSCP), hetero-duplex analysis, protein truncation test (PTT), and oligonucleotide ligation assay (OLA). The procedures to detect the mutation are well-known to those of ordinary skill in the art.

The term "sample" used herein refers to any biological sample obtained from the subject in need of therapy including a single cell, multiple cells, fragments of cells, a tissue sample, and/or body fluid. Specifically, the biological sample may include red blood cells, white blood cells, platelets, hepatocytes, epithelial cells, endothelial cells, a skin biopsy, a mucosa biopsy, an aliquot of urine, saliva, whole blood, serum, plasma, lymph. In some embodiments, the biological sample is taken from a tumor. In at least one embodiment, the biological sample is taken from whole blood of the subject, e.g., a mouse.

The concentration level of the cancer biomarker in a sample may be measured by an assay, for example an immunoassay. Typical immunoassay methods include, without limitation, enzyme-linked immunosorbent assay (ELISA), enzyme-linked immunospot assay (ELISPOT), Western blotting, immunohistochemistry (IHC), immunocytochemistry, immunostaining, and multiple reaction monitoring (MRM) based mass spectrometric immunoassay. The protocol for measuring the concentration of the biomarker and/or detecting the mutation in the biomarker is known to those of ordinary skill, for example by performing the steps outlined in the commercially available assay kit sold by Sigma-Aldrich, Thermo Fisher Scientific, R & D Systems, ZeptoMetrix Inc., Cayman Inc., Abcam, Trevigen, Dojindo Molecular Technologies, Biovision, and Enzo Life Sciences.

In some embodiments, a concentration of the biomarker is measured before and after the administration. When the concentration of the biomarker is maintained, the method may further comprise increasing the effective amount of the compound of the present disclosure by at least 5%, at least 10%, or at least 30%, up to 50%, up to 60%, or up to 80% of an initial effective amount The subject may be administered with the increased dosage for a longer period (e.g. 1 week more, 2 weeks more, or 2 months more) than the duration prescribed with the initial effective amount.

In some embodiments, the mutation in the biomarker is detected before administering the composition to identify subjects predisposed to the disease. Alternatively, the biomarkers are measured/detected after each administration. For example, the measurement may be 1-5 minutes, 1-30 minutes, 30-60 minutes, 1-2 hours, 2-12 hours, 12-24 hours, 1-2 days, 1-15 weeks, 15-20 weeks, 20-30 weeks, 30-40 weeks, 40-50 weeks, 1 year, 2 years, or any period of time in between after the administration.

In some embodiments, the administration is stopped once the subject is treated.

In some embodiments, the administering of the platinum (II) complex results in minimal therapy-induced toxicity and/or undesirable side effects. Examples of toxicity include, but are not limited to, nephrotoxicity, peripheral neuropathy, cardiotoxicity, pulmonary toxicity, blood toxicity, reproductive toxicity, dermal toxicity, hepatotoxicity, genotoxicity, and retinal toxicity. The toxicity may be apparent when the tissue is damaged and/or the gene(s) has mutations and may result in malfunctioning of the organ(s). In preferred embodiments, the toxicity is nephrotoxicity.

Symptoms of therapy-induced nephrotoxicity include, without limitation, excess urea in the blood (azotemia), anemia, increased hydrogen ion concentration in the blood (acidosis), excess fluids in the body (overhydration), and high blood pressure (hypertension). Cancer therapy-induced nephrotoxicity may be monitored by measuring the levels of the biomarkers such as serum creatinine (SCr, CRE2), blood urea nitrogen (BUN), urinary kidney injury molecule-1 (KIM-1), neutrophil gelatinase-associated lipocalin (NGAL), interleukin-18 (IL-18), cystatin C, clusterin, fatty acid binding protein-liver type (L-FABP), nuclear factor kappa-light-chain-enhancer of activated B cells (NF-κB), and osteopontin. In a subject diagnosed with therapy-induced nephrotoxicity, the level of serum creatinine (i.e., CRE2 level) and/or blood urea nitrogen (i.e., BUN level) may be at least 10%, 20%, or 30% higher than the level of the respective biomarker in a subject administered with the platinum(II) complex. For example, the level of serum creatinine in a subject administered with cisplatin may be at least 400% higher, 300% higher, or 200% higher than that in a subject administered with the platinum(II) complex (see Table 6). Further, the level of blood urea nitrogen in a subject administered with cisplatin may be at least 500% higher, 400% higher, or 350% higher than that in a subject administered with the platinum(II) complex (see Table 6). The general methods for determining the levels of the biomarkers are described above. Detailed steps for diagnosing and/or quantifying nephrotoxicity can be found in Examples 9 and 13.

In some embodiments, the quantification and/or the diagnosis of the nephrotoxicity may be performed before and/or after the administration of the platinum(II) complex(es). In some embodiments, the nephrotoxicity biomarkers are measured/detected after the administering of each dose of platinum(II) complex(es). For example, the measurement may be 1-5 minutes, 1-30 minutes, 30-60 minutes, 1-2 hours, 2-12 hours, 12-24 hours, 24-72 hours, 3-7 days, 1-15 weeks, 15-20 weeks, 20-30 weeks, 30-40 weeks, 40-50 weeks, 1 year, 2 years, or any period of time in between after the administration.

The examples below are intended to further illustrate protocols for preparing, characterizing, and using the platinum(II) complexes of the present disclosure, and are not intended to limit the scope of the claims.

Example 1

Materials and Instrumentation

All chemicals and solvents were of analytical grade and used without further purification. Dichlorido(dicyclopentdiene)platinum(II), AgPF$_6$, and sodium salts of dibenzyldithiocarbamate (Bz$_2$DTC), dimethyldithiocarbamate (Me$_2$DTC), and diethyldithiocarbamate (Et$_2$DTC) were purchased from Sigma-Aldrich, St. Louis, Mo. United States. Lung carcinoma (A549) and cervical cancer (HeLa) cell lines were purchased from the American Type Culture Collection, (ATCC, Manassas, Va., USA).

Elemental analysis was performed on Perkin Elmer Series 11(CHNS/O), Analyzer2400. The solid-state FTIR spectra were recorded on a Nicolet 6700 FTIR spectrophotometer using KBr pellets over the range of 4000-400 cm$^{-1}$ at a resolution of 4.00 cm$^{-1}$. $^1$H (500.01 MHz) and proton decoupled $^{13}$C (125.65 MHz) NMR spectra were recorded on a Jeol LAMBDA 500 NMR spectrophotometer. The $^1$H and $^{13}$C chemical shifts were referenced with respect to Tetramethylsilane (TMS) as an internal standard.

Example 2

Synthesis of [Pt($\eta^4$-DCP)(Dithiocarbamate)]PF$_6$ Complexes (1-3)

The complexes were synthesized by adding AgPF$_6$ (0.253 g, 1 mmol) dissolved in 5 mL of ethanol to chlorido (dicyclopentadiene)platinum(II) [Pt(DCP)Cl$_2$] (0.200 g, 0.5 mmol) in 20 mL dichloromethane to form a first mixture. The first mixture was stirred overnight at room temperature and filtered out. The respective sodium dithiocarbamate (0.5 mmol) dissolved in 5 mL of ethanol was added to the filtrate to form a second mixture. The second mixture was stirred for 4 hours and then filtered. A clear yellow solution was collected and kept in an undisturbed area. After five to seven days, yellow and orange solids were obtained, which were washed with water, dichloromethane, and diethyl ether three times (5 mL). The complexes were recrystallized from 1:1 mixture of dichloromethane/acetonitrile.

The model structures of the prepared complexes 1-3 and the resonance assignments are shown in FIG. 1.

Example 3

Structural Analysis

Complex 1: Calc. for $C_{13}H_{18}F_6NPPtS_2$, Mw=592.47 g/mol: C, 26.35; H, 3.06; N, 2.36; S, 10.82. Found: C, 27.22; H, 3.54; N, 2.11; S, 10.39. IR cm$^{-1}$: 1634(m), 1585(m), 1405(s), 1243(w), 1158 (m), 1078(m), 994 (w), 947 (m), 838 (s), 749 (m), 908 (w), 627 (w), 553 (s), 483 (m).

Complex 2: Calc. for $C_{15}H_{22}F_6NPPtS_2$, Mw=620.52 g/mol: C, 29.03; H, 3.57; N, 2.25; S, 10.33. Found: C, 28.44; H, 3.33; N, 1.99; S, 10.45. IR cm$^{-1}$: 2971(w), 2919(w), 1638(m), 1527 (s), 1437 (s), 1344 (m), 1274 (s), 1198 (m), 1151 (w), 10 73(m), 981 (m), 905 (w), 841(m), 764 (m), 558 (m), 488 (w).

Complex 3: Calc. for $C_{23}H_{26}F_6NPPtS_2$, Mw=744.66 g/mol: C, 40.34; H, 3.58; N, 1.88; S, 8.61. Found: C, 40.50; H, 3.83; N, 1.96; S. 9.49. IR cm$^{-1}$: 2929 (w), 2847 (w), 1639 (m), 192 (m), 1439 (m), 1350 (w), 1137 (w), 1221 (m), 1046 (m), 836 (m), 748 (m), 689 (m), 504 (s).

Example 4

Preparation and Characterization of Complexes 1-3

Reactions of chlorido(dicyclopentadiene)platinum(II) with an equimolar amount of dithiocarbamates (Bz$_2$DTC, Me$_2$DTC, and Et$_2$DTC) in a mixture of dichloromethane and ethanol yielded the corresponding [Pt($\eta^4$-DCP)(Dithiocarbamate)]PF$_6$ complexes (1-3). The complexes were isolated as crystalline solids, which are readily soluble in organic solvents, such as dichloromethane and DMSO.

The stoichiometry of the complexes was formulated on the basis of elemental analysis. The IR frequencies of the free ligands and their platinum(II) complexes are provided in Table 1.

TABLE 1

Mid FT-IR frequencies (cm$^{-1}$) of free ligands and complexes (1-3)

| Ligand/Complex | Stretch C—H (CH$_3$) | | Stretch C—N | Stretch C=C | Stretch S=C—N | Stretch S—C=S |
|---|---|---|---|---|---|---|
| DMDTC 1 | 2924 | 1360 | — | — | — | 1488 | 926 |
|  |  | 1405 |  | 1243 | 1634 | 1585 | 1078, 994 |
| DETDC 2 | 2925 | 1358 | — | 1397 | — | 1445 | 986 |
|  | 2971, 2919 | 1344 | 1437, 1198 | 1274 | 1638 | 1527 | 1073, 981 |
| DBDTC 3 | — | — | — | 1347 | 1600 | 1467 | 985 |
|  | 2929, 2847 | 1350 | 1439 | 1221 | 1639 | 1492 | 1046, 836 |

The $\nu$(C—H) and $\nu$(C=C) absorption bands due to DCP were observed at around 2900 cm$^{-1}$ and 1500 cm$^{-1}$, respectively. The C—H bending vibration was observed near 1400 cm$^{-1}$. In [Pt(DCP)Cl$_2$], these vibrations appeared at 2958 cm$^{-1}$ $\nu$(C—H), 1451 cm$^{-1}$ $\nu$(C=C), and 1420 cm$^{-1}$ for C—H bending vibrations. The DCP ligand itself exhibited bands at 1615 and 1572 cm$^{-1}$ ($\nu$(C=C)), and 1449 and 1439 cm$^{-1}$ ($\delta$(C—H)) [G. B. Deacon, B. M. Gatehouse, K. T.

Nelson-Reed, Preparations of chloro(diene) polyfluorophenylplatinum(II) complexes and the structure of chloro(dicyclopentadiene)pentafluorophenylplatinum(II), J. Organomet. Chem. 359 (1989) 267-283, incorporated herein by reference in its entirety]. The ν(N—CSS) mode of dithiocarbamates also appeared in the 1550-1420 cm$^{-1}$ region, and thus overlapped with the bands of DCP. This band of dithiocarbamates was shifted to higher frequency upon coordination, which is consistent with an increase in the carbon-nitrogen double bond character. The bands in the region of the 1070-940 cm$^{-1}$ region are attributed to the ν(-CSS) vibrations. A shift in frequency of these bands indicates the binding of dithiocarbamates to platinum(II). Spectroscopic data having similar trends were reported previously [G. Faraglia, D. Fregona, S. Sitran, L. Giovagnini, C. Marzano, F. Baccichetti, U. Casellato, R. Graziania, Platinum(II) and palladium(II) complexes with dithiocarbamates and amines: synthesis, characterization and cell assay, J. Inorg. Biochem. 83 (2001) 31-40; D. Fregona, L. Giovagnini, L. Ronconi, C. Marzano, A. Trevisan, S. Sitran, B. Biondi, F. Bordin, Pt(II) and Pd(II) derivatives of ter-butylsarcosinedithiocarbamate: Synthesis, chemical and biological characterization and in vitro nephrotoxicity, J. Inorg. Biochem. 93 (2003) 181-189; C. Marzano, D. Fregona, F. Baccichetti, A. Trevisan, L. Giovagnini, F. Bordin, Cytotoxicity and DNA damage induced by a new platinum (II) complex with pyridine and dithiocarbamate, Chem.-Biol. Interact. 140 (2002) 215-229; A. A. Isab, M. A. J. Ali, (2010) 1898-1905; and G. B. Deacon, B. M. Gatehouse, K. T. Nelson-Reed, Preparations of chloro(diene) polyfluorophenylplatinum(II) complexes and the structure of chloro (dicyclopentadiene)pentafluorophenylplatinum(II), J. Organomet. Chem. 359 (1989) 267-283, each incorporated herein by reference in their entirety].

$^1$H and $^{13}$C NMR chemical shifts of the complexes are given in Tables 2 and 3, respectively. In $^1$H NMR spectra of the complexes, N(C—H12) protons of dithiocarbamates appeared at around 4 ppm, which were found downfield shifted in complexes. The olefinic protons resonated in the region of 6-7 ppm. An upfield shift was observed for these signals upon binding of [Pt(DCP)] moiety to dithiocarbamates. Other C—H resonances were detected near 2 ppm. The N(C—H12) groups in 1 appeared as doublets, suggesting that the two protons are non-equivalent at 298 K.

The $^{13}$C NMR spectra of dithiocarbamates exhibited two prominent signals at around 50 and 200 ppm for the N—C12 and C11=S$_2$ carbons, respectively. In the Pt(II)-dithiocarbamate complexes, the N—C12 resonances shifted downfield due to increase in partial double character of the N—C bond. The CS$_2$ resonances appeared at an upfield position as compared to free ligands, which is attributed to the lowering of C=S bond order upon coordination. Similarly, because of the decrease in double bond character of C=C bonds in DCP, upfield shifts were observed for C5, C6, C9, and C10 resonances. The NMR signals of other carbon atoms remained almost unaffected.

TABLE 2

$^1$H NMR chemical shifts (δ) ppm of free ligands and (dicyclopentadiene)platinum(II) complexes (1-3) in DMSO-d$_6$

| Species | H1 | H2 | H3 | H4 | H5 | H6 | H7 | H8 | H9 | H10 | H12 | H13-H16 |
|---|---|---|---|---|---|---|---|---|---|---|---|---|
| [Pt(DCP)Cl$_2$] | 1.79,1.84 | 2.87 | 2.49 | 2.27 | 5.66 | 6.03 | 3.70 | 2.06 | 6.33 | 6.87 | — | — |
| 1 | 1.62,1.91 | 2.99 | 2.89 | 2.05 | 6.01 | 6.29 | 3.49 | 2.03 | 6.29 | 6.47 | 4.92, 4.82 | 7.26-7.39 |
| Bz$_2$DTC | — | — | — | — | — | — | — | — | — | — | 5.31, 4.77 | 7.24-7.39 |
| 2 | 1.52,1.71 | 2.85 | 2.30 | 2.06 | 6.65 | 6.33 | 3.30 | 2.27 | 6.01 | 6.87 | 3.64 | — |
| Me$_2$DTC | — | — | — | — | — | — | — | — | — | — | 3.35 | — |
| 3 | 2.04,2.02 | 2.98 | 2.89 | 2.12 | 5.92 | 6.24 | 3.61 | 2.70 | 6.41 | 7.11 | 3.95 | 1.23 |
| Et$_2$DTC | — | — | — | — | — | — | — | — | — | — | 3.93 | 1.13 |

TABLE 3

$^{13}$C NMR chemical shifts (δ) ppm of free ligands and (dicyclopentadiene)platinum(II) complexes (1-3) in DMSO-d$_6$

| Species | C1 | C2 | C3 | C4 | C5 | C6 | C7 | C8 | C9 | C10 | C=S | C12 | C13-16 |
|---|---|---|---|---|---|---|---|---|---|---|---|---|---|
| [Pt(DCP)Cl$_2$] | 55.7 | 55.2 | 33.2 | 42.6 | 98.4 | 105.3 | 59.4 | 43.1 | 117.3 | 101.5 | — | — | — |
| 1 | 55.9 | 54.0 | 29.6 | 45.5 | 106.3 | 109.2 | 61.2 | 53.8 | 119.3 | 108.1 | 200.2 | 58.1 | 127.9-145.7 |
| Bz$_2$DTC | — | — | — | — | — | — | — | — | — | — | 213.1 | 56.9 | 127.0-136.4 |
| 2 | 59.4 | 56.6 | 42.5 | 33.2 | 98.4 | 105.3 | 68.5 | 55.2 | 117.3 | 101.5 | 200.5 | 55.7 | — |
| Me$_2$DTC | — | — | — | — | — | — | — | — | — | — | 208.3 | 45.7 | — |
| 3 | 58.2 | 58.0 | 42.2 | 34.3 | 106.2 | 108.8 | 61.4 | 46.1 | 119.0 | 107.6 | 195.3 | 48.1 | 12.5 |
| Et$_2$DTC | — | — | — | — | — | — | — | — | — | — | 206.4 | 49.5 | 12.1 |

S. Sharif, I. U. Khan, S. K. Kang, T. Khalid, M. Saleem, S. Ahmad, Synthesis, Crystal Structure and Antimicrobial Studies of Chlorido(dimethylsulfoxide-κS)(pyrrolidinedithiocarbamato-κ$^2$S,S′)platinum(II), Inorg. Chem. Commun. 14 (2011) 1962-1965; A. Klein, A. Luning, I. Ott, L. Hamel, M. Neugebauer, K. Butsch, V. Lingen, F. Heinrich, S. Elmas, Organometallic palladium and platinum complexes with strongly donating alkyl coligands-Synthesis, structures, chemical and cytotoxic properties, J. Organomet. Chem 695

Example 5

Cell Culture

The A549 and HeLa cell lines were cultured directly in DMEM (Dulbecco's Modified Eagle Medium), and then supplemented with 10% fetal bovine serum (FBS) and 1% streptomycin/penicillin. Then, the cancer cell samples were kept in a humidified incubator at 37° C. with 5% CO$_2$.

Example 6

Cytotoxicity Assay: xCelligence Real-Time Cell Analysis (RTCA)

The cytotoxicity of complexes was measured using xCelligence RTCA DP system (ACEA Biosciences, San Diego, Calif., USA). Briefly, the instrument was positioned in a humidified incubator at 37° C. with 5% $CO_2$. The cytotoxicity experiments were conducted using modified 16-well plate (E-plate) with gold-microelectrodes attached at the base of the wells for the impedance-based attachment detection, cell distribution, and proliferation. A 50 µL of cell-free growth DMEM with 10% FBS was added to the wells. Then, the system was connected to measure the background impedance for each well for 30 min. A549 and HeLa cells were harvested using 0.05% Trypsin-EDTA (ethylenediaminetetraacetic acid), and then counted using LUNA automated cell counter (Logos Biosystem, Seoul, South Korea). 50 µL of the cell suspension was then added directly to each well containing 50 µL of cell-free growth DMEM with 10% FBS—Final to reach cell density of $5 \times 10^3$. The plates were left at room temperature for about 30 minutes and then inserted to xCelligence RTCA DP device. The xCelligence RTCA system software v.2.0 automatically monitored the impedance value of individual well. These values are expressed as CI (Cell Index) every 15 minutes. When the cells reached the log-growth phase, various concentrations (0, 1.75, 3.25, 7.5, 15, 30 µM) of complexes 1, 2, 3 and Cisplatin (positive control) were added in duplicate. Then, cells were real time-monitored for 72 hours. All tested compounds were dissolved in DMSO, while cisplatin in normal saline solution. The final concentration of DMSO was less than 0.1% in each well. For negative control, 0.1% DMSO solution was used. Then $IC_{50}$ values for all compounds at 24 hours and 72 hours were calculated using RTCA software v.2.0.

Example 7

The Lactate Dehydrogenase (LDH) Assay

The release of lactate dehydrogenase (LDH) of A549 and HeLa cells in response to the cytotoxic effect of complexes 1 and 2 was measured using the LDH cytotoxic kit protocol (Dojindo, japan). The A549 and HeLa cells were plated into 96-well plate at $5 \times 10^5$ density for overnight. The cells were treated with complexes (1 and 2) at concentrations of $IC_{25}$ (0.9 µM), $IC_{50}$ (1.8 04), and $IC_{100}$ (3.6 µM) in triplicate for about 72 hours. In the day of reading, 10 µL of the Lysis Buffer was added to each well of the high control. The plate was incubated at 37° C. in $CO_2$ incubator for 30 minutes. Then, 100 µL of the Working Solution was added to each well and incubated at room temperature for 30 minutes. Then, 50 µL of the Stop Solution was added to each well before measuring the absorbance at 490 nm using Mithras 943 micro-plate reader (Berthold Tech, Wildbad, Germany). The high control (DMSO+Cells suspension+lysis buffer) and low control (DMSO+cell suspension) were used to determine the percentage of fold changes in LDH according to the following equation (I).

% in LDH changes=(Low control−Test)/(Low control−High control)×100     (I)

Example 8

Wound Healing Assay

The Culture-Insert 2 Well (ibidi Gmbh, Germany) was placed into micro-plate 24. 70 µL of $5 \times 10^5$ of HeLa cells was seeded into the culture-insert. The seeded cells were incubated for 24 hours under a specific condition (37° C., 5% $CO_2$) to form monolayer cells. After 24 hours of the incubation, the culture-inserts were removed and the cells were gently washed with PBS to remove cell debris and detached cells. The cells were then treated with the cell culture mediums containing complex 1 at specific concentrations (1, 3, 10, 30 µM) and containing 0.1% DMSO as control. All assays were conducted in duplicates. In order to analyze the migration capacity, images of the cells were taken at 0 hours, 6 hours, and 12 hours using Optika microscope, Italy. The gap closure was determined using a web-based quantitative image solution (http://www.metavilabs.com/metavi2/index-.html)

Example 9

Acute Kidney Toxicity Study

The acute kidney toxicity study was conducted according to a previously reported literature [Abdullah Ozkok, Kameswaran Ravichandran, Qian Wang, Danica Ljubanovic, Charles L. Edelstein, NF-κB transcriptional inhibition ameliorates cisplatin-induced acute kidney injury (AM), Toxicology Lett., 240 (2016) 105-113, incorporated herein by reference in its entirety]. Nine male mice of six-eight weeks old were used to evaluate the acute kidney toxicity of complex 1 and cisplatin. The mice were separated into three groups ((I), (II), and (III)) with four animals per each cage. Group (I) was served as normal control group, which received only vehicle (0.1 volume % DMSO). Group (II) was served as positive control, which received 25 mg/kg cisplatin. Group (III) served as the experimental group, which received an equimolar amount of complex 1 compared to cisplatin. Six hours prior to the experiment, no food and water were given. After the treatment, the animals were observed for the first 30 minutes and then for 4-5 times intervals during a 72-hour period to discern any abnormality signs. On the day three, the animals were sacrificed by the overdose of xylazine and ketamine anesthesia. Blood samples were collected for Blood Urea Nitrogen (BUN) and serum creatinine (CRE2) measurements. All mice were allowed one week to acclimatize prior to the experiments (five animals per cage), under standard environmental conditions (12 h light-dark cycle). The animal studies were performed according to the king Saud University ethical committee.

Example 10

In Vitro Cytotoxicity Assay Results

The xCelligence system is a technology that allows continuous and quantitative monitoring of cells. The application of gold-microelectrodes in RTCA plates for the measurement of electronic impedance enables observation of the viability of tested cells at every acquisition point of time during an experiment. Additionally, there is no need to terminate the experiment and label cells in order to determine $IC_{50}$ values, which is the case for end-point assays. Furthermore, due to the use of sensor arrays in the plates, the RTCA system detects cell changes with higher sensitivity than other cytotoxicity assays, and thus provides more information than single-value end-points obtained in classical tests. Hence, the xCelligence system is advantageous in cytotoxicity research, especially for screening potential anticancer drugs and monitoring of the effects of compounds on cells over a period of hours or even days [Dowling, C. M.; Herranz Ors, C.; Kiely, P. A. Using real-time impedance-based assays to monitor the effects of fibroblast-derived media on the adhesion, proliferation, migration and invasion of colon cancer cells. Biosci. Rep. 34 (2014) e00126; Van Oosterwijk, J. G.; van Ruler, M. A.; Briaire-de Bruijn, I. H.; Herpers, B.; Gelderblom, H.; van de Water, B.; Bovée, J. V. M. G. Src kinases in chondrosarcoma chemoresistance and migration: Dasatinib sensitises to doxorubicin in TP53 mutant cells. Br. J. Cancer 109 (2013) 1214-1222; Pan, T.; Khare, S.; Ackah, F.; Huang, B.; Zhang, W.; Gabos, S.; Jin, C.; Stampfl, M. In vitro cytotoxicity assessment based on KC(50) with real-time cell analyzer (RTCA) assay. Comput. Biol. Chem. 47 (2013) 113-120; Pan, T.; Huang, B.; Zhang, W.; Gabos, S.; Huang, D. Y.; Devendran, V. Cytotoxicity assessment based on the AUC50 using multi-concentration time-dependent cellular response curves. Anal. Chim. Acta 764 (2013) 44-52; and D. Kho, C. MacDonald, R. Johnson, C. P. Unsworth, S. J. O'Carroll, E. du Mez, C. E. Angel, E. S. Graham. Application of xCELLigence RTCA Biosensor Technology for Revealing the Profile and Window of Drug Responsiveness in Real Time. Biosensors 5 (2015) 199-222, each incorporated herein by reference in their entirety].

The compound-induced cytotoxicity was measured by analyzing RTCA impedance profiles and calculated the $IC_{50}$ values of complexes 1, 2, 3, and cisplatin against A549 and HeLa cancer cell lines. For all impedance profiles, the sigmoidal dose-response curves (FIGS. 2A-D) were obtained, and $IC_{50}$ values were calculated (see Table 4). The calculations were based upon the CI, which is a relative and dimensionless value representing the impedance change divided by the background value, and thus reflects the overall number of cells and the quality of their attachment [D. Kho, C. MacDonald, R. Johnson, C. P. Unsworth, S. J. O'Carroll, E. du Mez, C. E. Angel, E. S. Graham. Application of xCELLigence RTCA Biosensor Technology for Revealing the Profile and Window of Drug Responsiveness in Real Time. Biosensors 5 (2015) 199-222, incorporated herein by reference in its entirety]. The CI can change as a function of time, resulting in time-dependent and dose-dependent impedance profiles during an experiment [D. Kho, C. MacDonald, R. Johnson, C. P. Unsworth, S. J. O'Carroll, E. du Mez, C. E. Angel, E. S. Graham. Application of xCELLigence RTCA Biosensor Technology for Revealing the Profile and Window of Drug Responsiveness in Real Time. Biosensors 5 (2015) 199-222, incorporated herein by reference in its entirety]. For each experiment, $IC_{50}$ values were calculated based on: Sigmoidal dose-response (Variable slope)—

$$Y=\text{Bottom}+(\textit{Top}-\text{Bottom})/(1+10^{((\text{Log } IC_{50}-X)*\text{Hill-Slope})})$$

$IC_{50}$ values for complexes 1, 2, 3 and cisplatin against A549 and HeLa cell lines recorded for 24 and 72 hours are summarized in Table 4.

TABLE 4

$IC_{50}$ values (µM) of platinum(II) complexes against A549 and HeLa cancer cell lines

| | $IC_{50}$ (µM) | | | |
| --- | --- | --- | --- | --- |
| | A549 | | Hela | |
| Complex | 24 hours | 72 hours | 24 hours | 72 hours |
| 1 | 2.92 | 1.74 | 1.72 | 1.87 |
| 2 | 7.61 | 3.37 | 6.10 | 3.52 |
| 3 | 3.31 | 7.83 | 3.18 | 11.4 |
| Cisplatin | >30 | >30 | >30 | >30 |

Based on the $IC_{50}$ values, all complexes were found more potent than cisplatin in both 24 and 72 hours test period for A549 and Hela cell lines. However, in the case of complex 3, a decrease in cytotoxicity was observed with longer exposure time, which might be due to the breakdown of the drug by the cells or instability of the complex under such conditions. Previous studies on platinum-cyclooctadiene (COD) complexes [K. Butsch, S. Elmas, N. Sen Gupta, R. Gust, F. Heinrich, A. Klein, Y. von Mering, M. Neugebauer, I. Ott, M. Schafer, H. Scherer, T. Schurr, Organoplatinum(II) and palladium(II) complexes of Nucleobases and their derivatives, Organometallics 28 (2009) 3906-3915; and A. Klein, A. Luning, I. Ott, L. Hamel, M. Neugebauer, K. Butsch, V. Lingen, F. Heinrich, S. Elmas, Organometallic palladium and platinum complexes with strongly donating alkyl coligands-Synthesis, structures, chemical and cytotoxic properties, J. Organomet. Chem 695 (2010) 1898-1905, each incorporated herein by reference in their entirety] indicated that replacing the chlorido ligands of [(COD)PtCl$_2$] with organic substituents typically resulted in a considerable increase in cytotoxic potency. However, the enhancement was not significant except for one compound. For the present series of compounds, especially complex 1, a very large increase in antitumor activity was observed compared to cisplatin. The strikingly high cytotoxicity of the compounds could be attributed to the lipophilic nature of dicyclopentadiene and the leaving group of intermediate strengths (dithiocarbamates). The results suggest that the dithiocarbamate ligands play a significant role in introducing anticancer capability to the present series of compounds, since the alkene back-bone skeleton in the above two types of complexes are similar.

Example 11

LDH Cytotoxicity Test Results

Figure 3A:
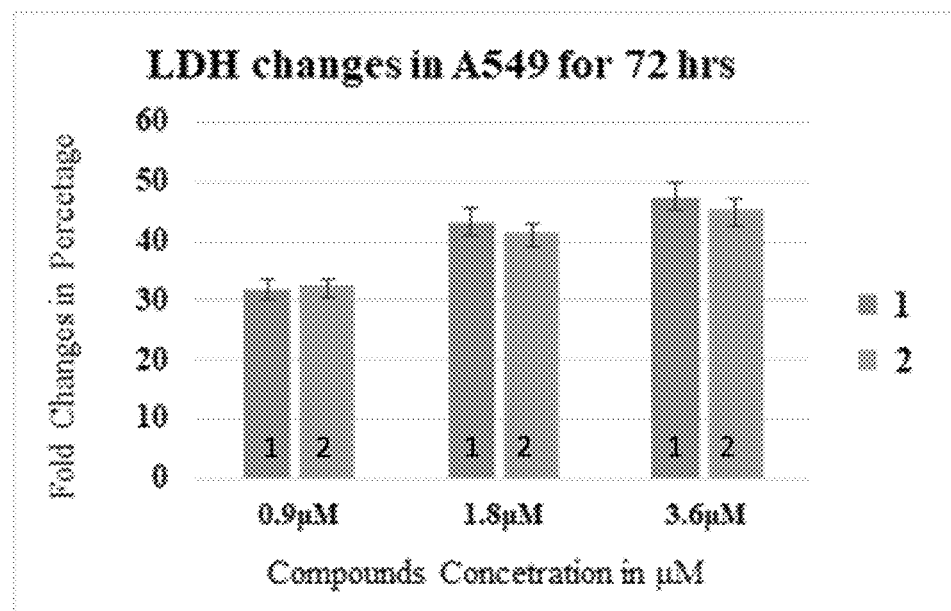
FIG. 3A is a bar graph summarizing percent releases of lactate dehydrogenase (LDH) from A549 cells when exposed to platinum(II) complexes 1 ("1") and 2 ("2") for 72 h at different concentrations.
Figure 3B:
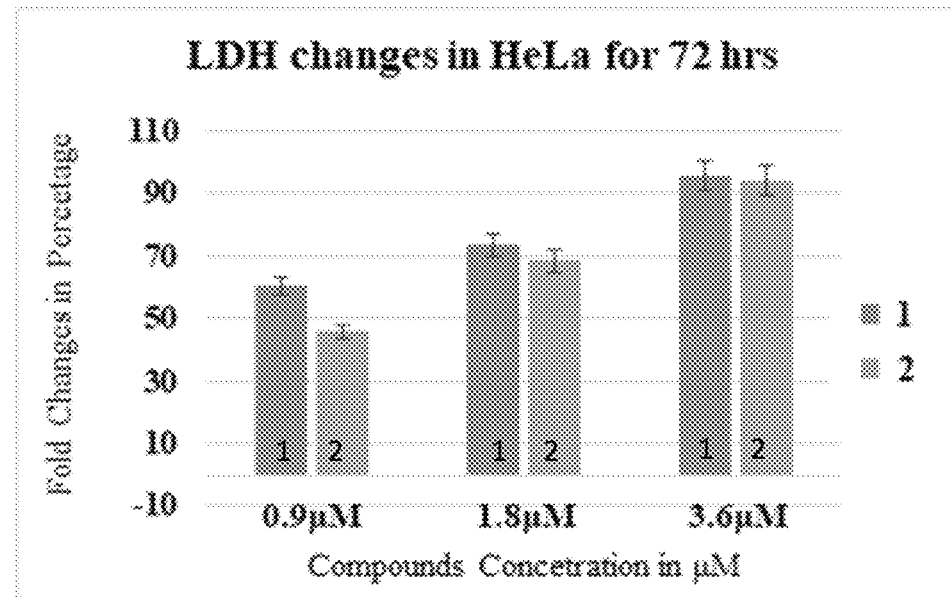
FIG. 3B is a bar graph summarizing percent releases of lactate dehydrogenase (LDH) from HeLa cells when exposed to platinum(II) complexes 1 ("1") and 2 ("2") for 72 h at different concentrations.

The release of lactate dehydrogenase (LDH) directly into the culture medium is an indication of loss of membrane integrity of a cell due to necrosis or apoptosis. Therefore, the LDH activity in the medium can be used as an indicator for cell membrane integrity, and thus for measuring cytotoxicity. LDH is released as NAD+, which is reduced to NADH and H+ through the oxidation of lactate to pyruvate. The cytotoxic effect of complexes 1 and 2 was evaluated by the release of lactate dehydrogenase (LDH) on treated cells (A549 and HeLa). The cells were treated with the complexes at concentrations of 0.9 µM, 1.8 µM, and 3.6 µM, respectively, for 72 hours. The two compounds induced LDH release elevated in a dose dependent manner as shown in Table 5 and FIGS. 3A-B. Both complexes induced very high cytotoxicity to HeLa cells (i.e., close to 100% release of LDH) at 3.6 µM.

TABLE 5

Percent (%) release of LDH from the A549 and
HeLa cell lines treated with 1 and 2 at different concentrations

|  | A549 | | | HeLa | | |
|---|---|---|---|---|---|---|
| Comp./Conc. | 0.9 μM | 1.8 μM | 3.6 μM | 0.9 μM | 1.8 μM | 3.6 μM |
| 1 | 31.93 ± 0.01 | 43.33 ± 0.02 | 47.00 ± 0.01 | 60.16 ± 0.02 | 73.07 ± 0.03 | 95.57 ± 0.02 |
| 2 | 32.18 ± 0.004 | 41.05 ± 0.01 | 44.85 ± 0.01 | 45.52 ± 0.001 | 68.19 ± 0.04 | 94.13 ± 0.05 |

Example 12

Wound Healing Assay Results

Cell migration is essential in the development and maintenance of multicellular organism. It plays a central role in tissue formation during embryonic development, organ formation, immune responses, and most importantly (as in this experiment) in wound healing. Wound healing assay is a standard in vitro technique to determine collective cell migration in two dimensions. In this assay, an insert is used to create a cell-free gap in confluent monolayer cells. The wound healing assay is initiated by removing the insert. The cell-free gap is then exposed to the cell culture medium to induce the cells to migrate into the gap until new cell-to-cell contacts are established.

Figure 4A:
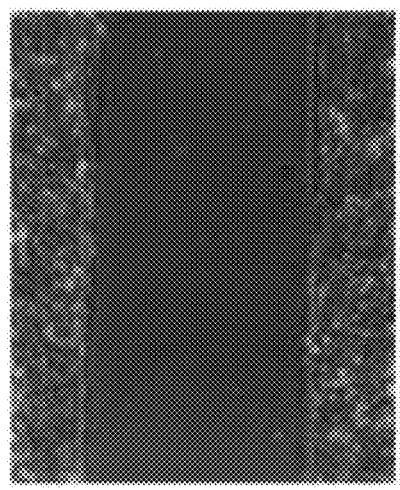
FIG. 4A is an image of HeLa cells with an initial cell-free gap before treatment (0 h) with 0.1 volume % DMSO (see Examples 8 and 12 for detailed descriptions of wound healing assay).
Figure 4B:
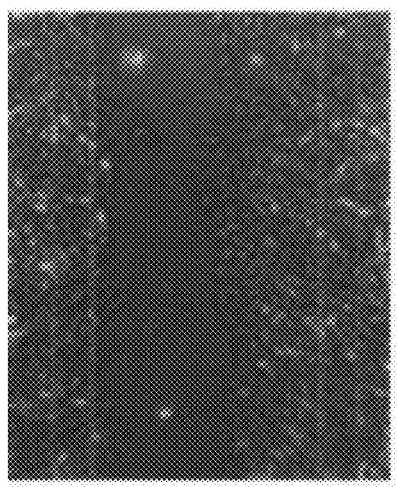
FIG. 4B is a wound healing image of HeLa cells of FIG. 4A after a 6 h treatment with 0.1% DMSO.
Figure 4C:
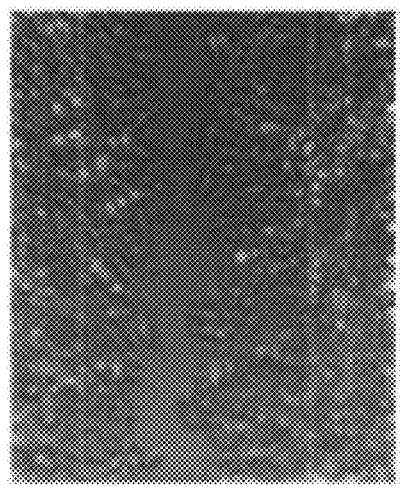
FIG. 4C is a wound healing image of HeLa cells of FIG. 4A after a 12 h treatment with 0.1% DMSO.
Figure 4D:
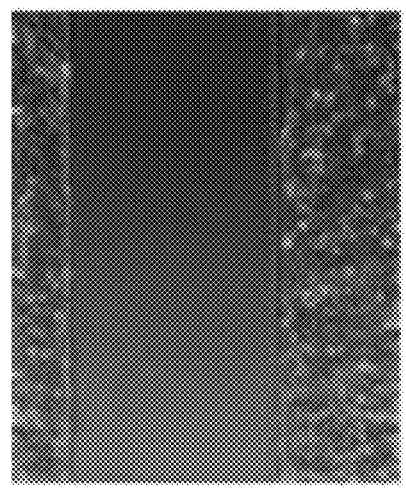
FIG. 4D is an image of HeLa cells with an initial cell-free gap before treatment (0 h) with platinum(II) complexes 1 at 1 µM.
Figure 4E:
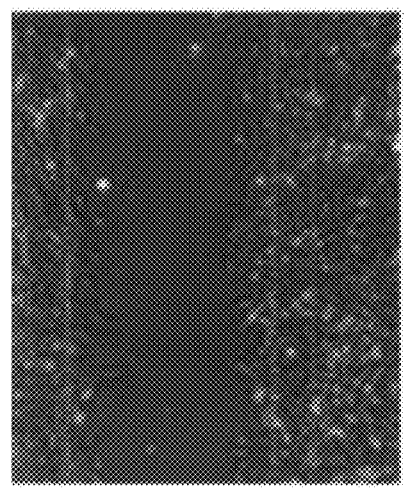
FIG. 4E is a wound healing image of HeLa cells of FIG. 4D after a 6 h treatment with platinum(II) complexes 1 at 1 µM.
Figure 4F:
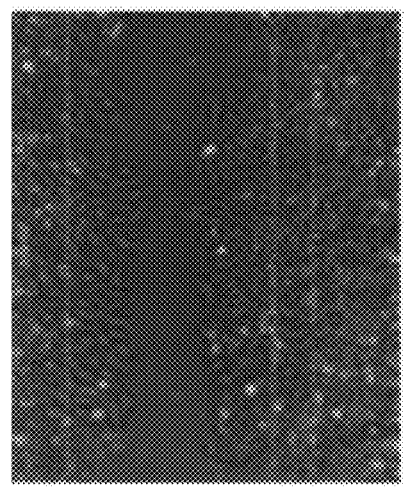
FIG. 4F is a wound healing image of HeLa cells of FIG. 4D after a 12 h treatment with platinum(II) complexes 1 at 1 µM.
Figure 4G:
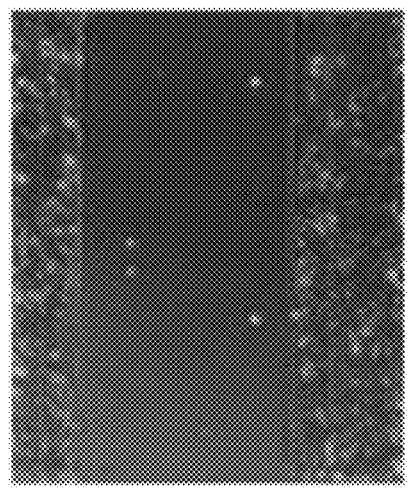
FIG. 4G is an image of HeLa cells with an initial cell-free gap before treatment (0 h) with platinum(II) complexes 1 at 3 µM.
Figure 4H:
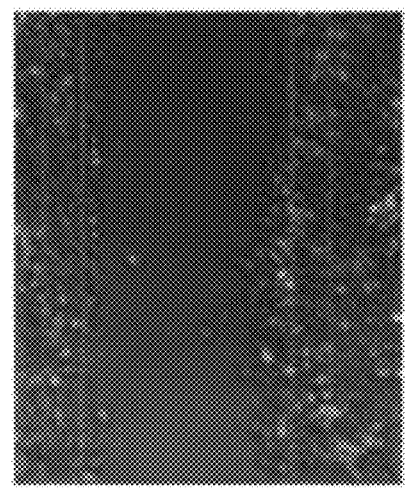
FIG. 4H is a wound healing image of HeLa cells of FIG. 4G after a 6 h treatment with platinum(II) complexes 1 at 3 µM.
Figure 4I:
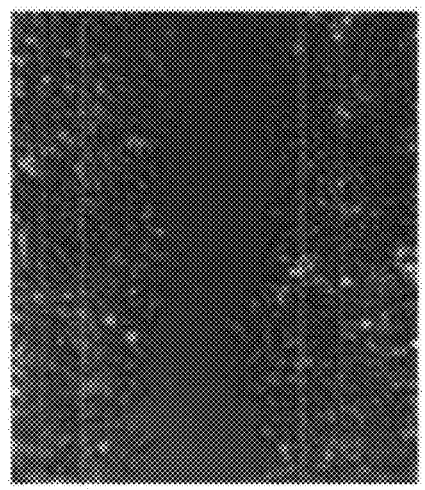
FIG. 4I is a wound healing image of HeLa cells of FIG. 4G after a 12 h treatment with platinum(II) complexes 1 at 3 µM.
Figure 4J:
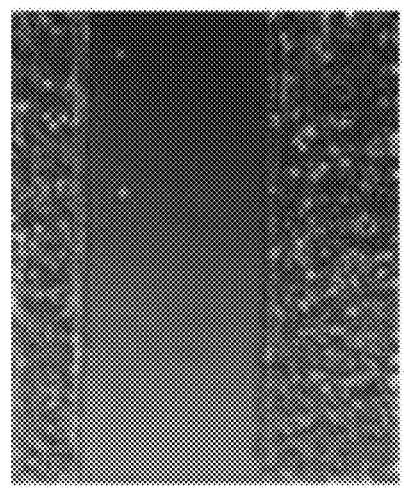
FIG. 4J is an image of HeLa cells with an initial cell-free gap before treatment (0 h) with platinum(II) complexes 1 at 10 µM.
Figure 4K:
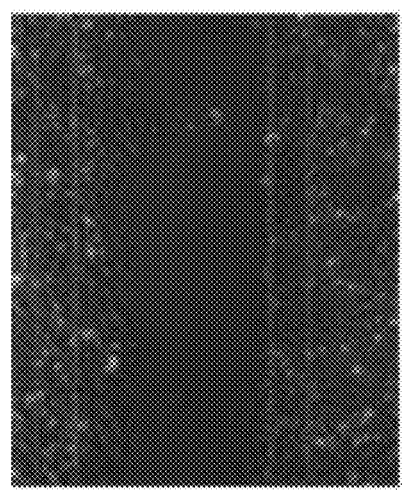
FIG. 4K is a wound healing image of HeLa cells of FIG. 4J after a 6 h treatment with platinum(II) complexes 1 at 10 µM.
Figure 4L:
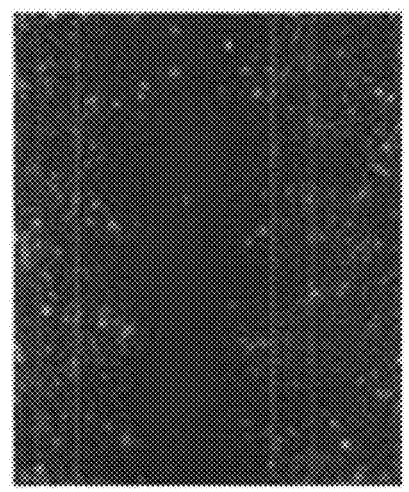
FIG. 4L is a wound healing image of HeLa cells of FIG. 4J after a 12 h treatment with platinum(II) complexes 1 at 10 µM.
Figure 4M:
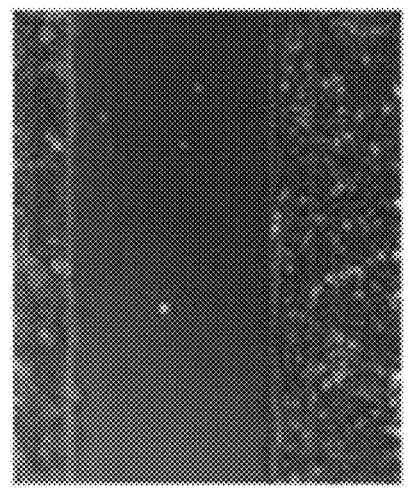
FIG. 4M is an image of HeLa cells with an initial cell-free gap before treatment (0 h) with platinum(II) complexes 1 at 30 µM.
Figure 4N:
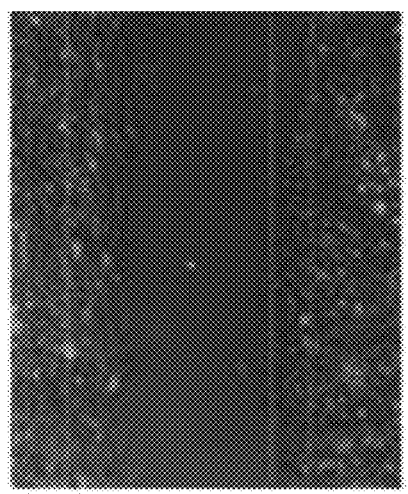
FIG. 4N is a wound healing image of HeLa cells of FIG. 4M after a 6 h treatment with platinum(II) complexes 1 at 30 µM.
Figure 4O:
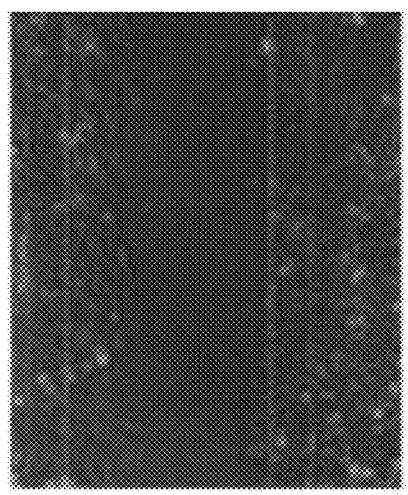
FIG. 4O is a wound healing image of HeLa cells of FIG. 4M after a 12 h treatment with platinum(II) complexes 1 at 30 µM.
Figure 5A:
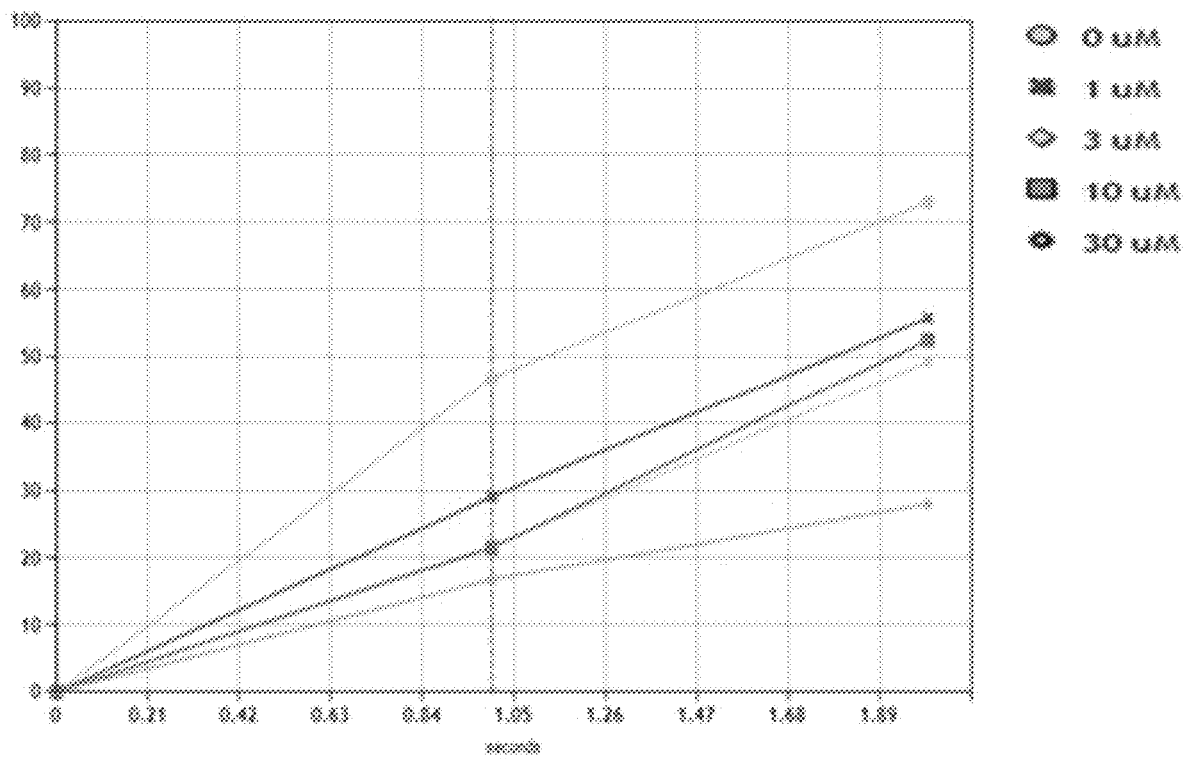
FIG. 5A is a graph illustrating percent (%) scratch closure of wounded HeLa cells when treated with platinum(II) complexes 1 at 0 µM (0.1% DMSO), 1 µM, 3 µM, 10 µM, and 30 µM, respectively, as a function of treatment time (s).
Figure 5B:
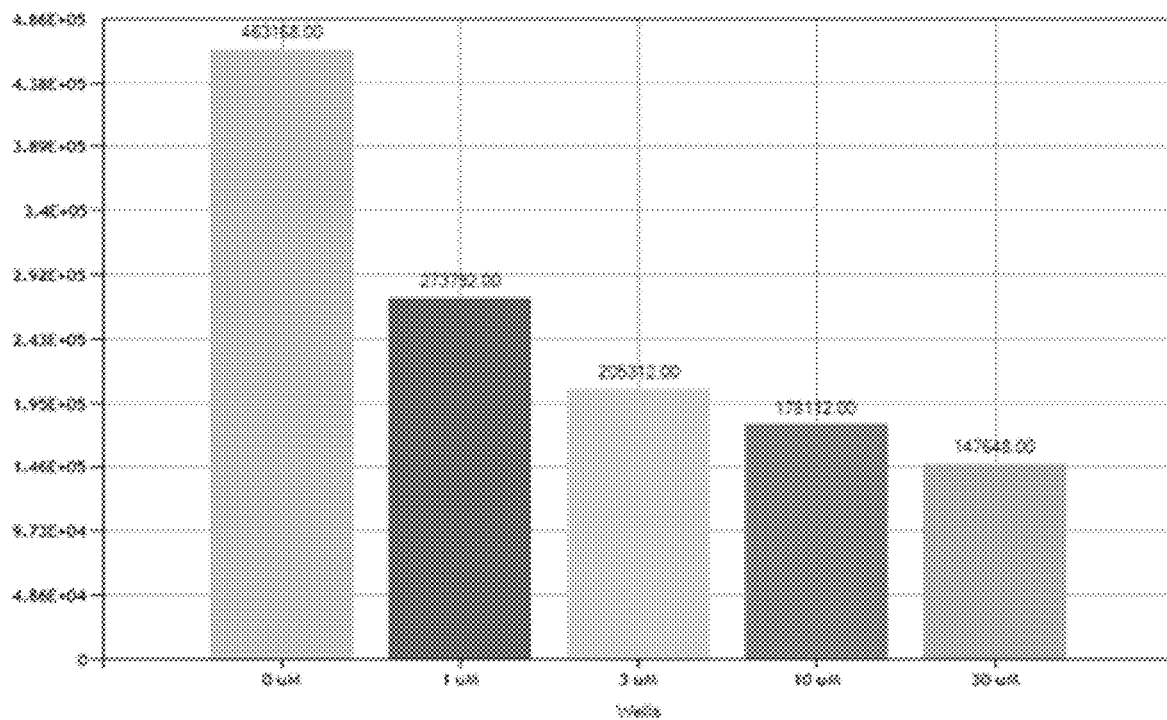
FIG. 5B is a bar graph summarizing scratch closure speeds ($µm^2$/second) of wounded HeLa cells when treated with platinum(II) complexes 1 at 0 µM (0.1% DMSO), 1 µM, 3 µM, 10 µM, and 30 µM, respectively.

The wound healing images were recorded at three different time intervals using microscope to assess the directional collective migration of the cells. The rate of wound healing was determined by measuring the change in the gap size of the cell-free area after treatment with various concentrations of complex 1 recorded over specific time-intervals (e.g., 0 hour, 6 hours, and 12 hours). The gap was measured for each frame in the wound healing and plotted as a function of time to determine the cell migration rate. The effect of varying concentration of complex 1 (1, 2, 10, 30 μM) and 0.1% of DMSO (control cells) against HeLa cell migration rate was studied. Images recording the cells after treatment over different time-intervals (0 h, 6 h, 12 h) showed that cells treated with 1 μM of complex 1 resulted in the highest gap closure comparable to the controlled cells treated with DMSO (FIGS. 4A-O). Importantly, higher concentrations of complex 1 significantly decreased the wound gap-closure. In addition, as seen in FIGS. 5A and B, it was demonstrated that cells treated with DMSO migrated approximately 73% of the cell-free area. Meanwhile, the cells treated with four different concentrations of complex 1 (1, 3, 10, 30 μM) migrated approximately 57%, 54%, 49%, and 28%, respectively. These results indicated that complex 1 reduced HeLa cells' ability to close the artificial wounds (scratches) as compared to untreated control cells. Thus, complex 1 showed greater inhibition of migration (invasion) activity of cancer cells than the controls. It can be inferred that complex 1 slowed down the cell migration rate in a concentration-dependent manner. Further molecular studies are required to understand the mechanism behind the inhibition of cell migration.

Example 13

Acute Kidney Toxicity Study Results

Figure 6A:
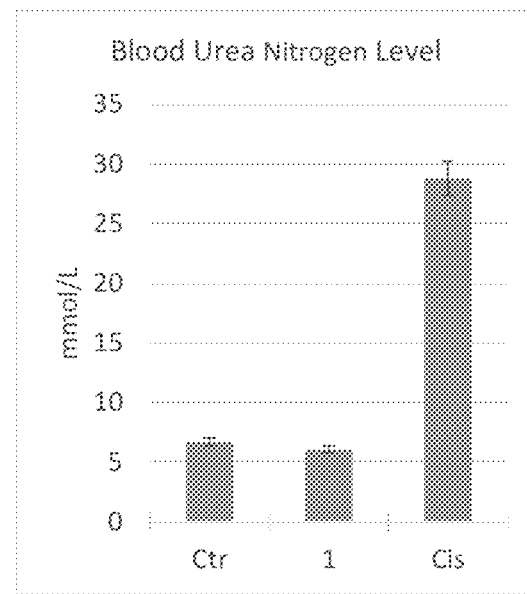
FIG. 6A is a bar graph summarizing blood urea nitrogen (BUN) levels of mice measured 72 h after administrations of 0.1 volume % DMSO ("Ctr"), 25 mg/kg of cisplatin ("Cis"), and platinum(II) complex 1 ("1") at an equimolar amount of 25 mg/kg cisplatin, respectively (see Examples 9 and 13 for detailed descriptions of acute kidney toxicity study).
Figure 6B:
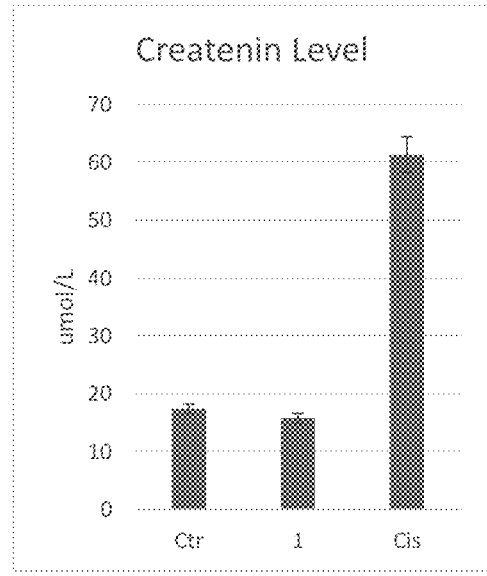
FIG. 6B is a bar graph summarizing createnin (CRE2) levels of mice measured 72 h after administrations of 0.1% DMSO ("Ctr"), 25 mg/kg of cisplatin ("Cis"), and platinum (II) complex 1 ("1") at an equimolar amount of 25 mg/kg cisplatin, respectively.

In the acute toxicity study, mice were treated with complex 1 and cisplatin, respectively, at equimolar single doses of 25 mg/kg. After 72 hours, all animals survived the treatment period. No physical or abnormal changes were observed. Kidney biochemical markers, BUN and CRE2, were used for nephrotoxicity study. The BUN and CRE2 levels in response to complex 1 were reported as control and normal. Importantly, cisplatin induced a four-fold increase in both BUN and CRE2 levels compared to complex 1 (Table 6 and FIGS. 6A and B).

TABLE 6

Blood Urea Nitrogen (BUN) and
Creatinine (CRE2) level in Plasma

| CTR | | 1 | | Cisplatin | |
|---|---|---|---|---|---|
| Kidney | | Kidney | | Kidney | |
| BUN | CRE2 | BUN | CRE2 | BUN | CRE2 |
| 6.7 ± 0.1 | 17.4 ± 0.58 | 6.06 ± 0.08 | 15.8 ± 0.45 | 28.8 ± 0.3 | 61.33 ± 0.31 |

Example 14

The present disclosure describes the synthesis, structure analysis, and in vitro antitumor activities of organometallic complexes containing dicyclopentadiene (DCP) and dithiocarbamates ligands. The presently disclosed organometallic complexes have been developed by exploiting the use of lipophilic diene ligands, which could improve the delivery of platinum complexes during cancer treatment. The less labile dithiocarbamate leaving groups may help lower the toxicity level of the complexes by preventing their deactivation by thiols.

The spectroscopic data strongly supported that the dithiocarbamate ligands coordinated to the Pt(II) center through the sulfur atom. In vitro cytotoxicity analysis of complexes (1, 2, and 3) showed their remarkably higher cytotoxicity in A549 and HeLa cells as compared to cisplatin. The LDH and Wound healing assays offered further evidence to support the promising antitumor activity of these complexes. The high cytotoxic activity of the complexes may result from the combined effect of lipophilic diene groups and the sulfur donor ligands. The stability of the complexes would also lead to diminished side effects. With respect to acute kidney toxicity, complex 1 was found less toxic compared to cisplatin, as revealed by nephrotoxicity tests. The complexes disclosed herein can provide suitable models as potential anticancer agents for clinical testing.

The invention claimed is:

1. A platinum(II) complex of formula (I)

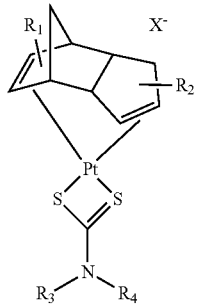

(I)

or a salt thereof, a solvate thereof, a tautomer thereof, a stereoisomer thereof, or a mixture thereof,
wherein:
$R_1$ and $R_2$ are each independently a hydrogen or an optionally substituted $C_1$ to $C_3$ alkyl;
$R_3$ and $R_4$ are each independently selected from the group consisting of a hydrogen, an optionally substituted alkyl, an optionally substituted cycloalkyl, an optionally substituted arylalkyl, and an optionally substituted aryl; and
X is an anion.

2. The platinum(II) complex of formula (I) of claim 1, wherein $R_1$ and $R_2$ are each independently hydrogen, methyl, or ethyl.

3. The platinum(II) complex of formula (I) of claim 1, wherein $R_1$ and $R_2$ are each hydrogen.

4. The platinum(II) complex of formula (I) of claim 1, wherein $R_3$ and $R_4$ are each independently a $C_1$ to $C_8$ alkyl or a $C_7$ to $C_{12}$ arylalkyl.

5. The platinum(II) complex of formula (I) of claim 1, wherein $R_3$ and $R_4$ are each methyl, ethyl, or benzyl.

6. The platinum(II) complex of formula (I) of claim 1, wherein the anion is a hexafluorophosphate ion, a trifluoromethanesulfonate ion, a tetrafluoroborate ion, a perchlorate ion, or a halide ion.

7. The platinum(II) complex of formula (I) of claim 1, wherein the anion is hexafluorophosphate ion.

8. The platinum(II) complex of formula (I) of claim 1, which is selected from the group consisting of:

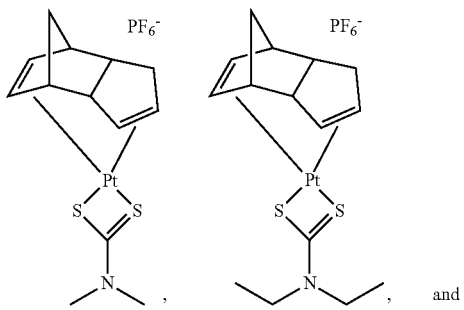

and

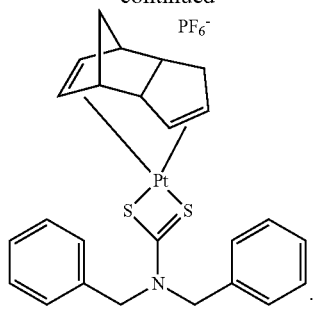

9. A pharmaceutical composition, comprising:
the platinum(II) complex of formula (I) of claim 1; and
a pharmaceutically acceptable carrier and/or excipient.

10. The pharmaceutical composition of claim 9, which comprises 0.5-50 μM of the platinum(II) complex of formula (I) relative to a total volume of the pharmaceutical composition.

11. The pharmaceutical composition of claim 9, wherein the pharmaceutically acceptable carrier and/or excipient is at least one selected from the group consisting of a buffer, an inorganic salt, a fatty acid, a vegetable oil, a synthetic fatty ester, a surfactant, and a polymer.

12. The pharmaceutical composition of claim 9, wherein the platinum(II) complex of formula (I) is

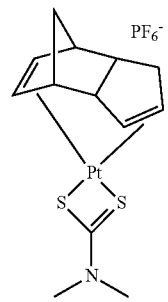

13. A method for treating a proliferative disorder, the method comprising:
administering the pharmaceutical composition of claim 9 to a subject in need of therapy.

14. The method of claim 13, wherein 0.01-50 mg/kg of the platinum(II) complex of formula (I) is administered per body weight of the subject.

15. The method of claim 13, wherein the proliferative disorder is cancer.

16. The method of claim 15, wherein the cancer is lung cancer and/or cervical cancer.

17. The method of claim 15, wherein the cancer is resistant to at least one platinum-based chemotherapy drug.

18. The method of claim 17, wherein the platinum-based chemotherapy drug is cisplatin.

19. The method of claim 13, wherein the subject is a mammal.

20. A method of synthesizing the platinum(II) complex of formula (I) of claim 1, the method comprising:

mixing a platinum(II) compound of formula (II)

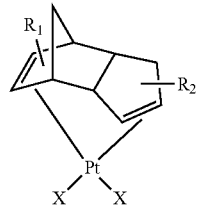

(II)

or a salt thereof, a solvate thereof, a stereoisomer thereof, or a mixture thereof, a dithiocarbamate salt of formula (III)

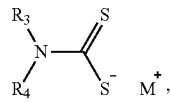

(III)

and a solvent thereby forming the platinum(II) complex of formula (I), wherein:
$R_1$ and $R_2$ are each independently a hydrogen or an optionally substituted $C_1$ to $C_3$ alkyl;
$R_3$ and $R_4$ are each independently selected from the group consisting of a hydrogen, an optionally substituted alkyl, an optionally substituted cycloalkyl, an optionally substituted arylalkyl, and an optionally substituted aryl;
X is an anion; and
M is an alkali metal cation.

* * * * *